US012593051B2

(12) United States Patent
Damghanian et al.

(10) Patent No.: US 12,593,051 B2
(45) Date of Patent: Mar. 31, 2026

(54) COMPUTATIONAL COMPLEXITY INDICATOR

(71) Applicant: Telefonaktiebolaget LM Ericsson (publ), Stockholm (SE)

(72) Inventors: Mitra Damghanian, Upplands-Bro (SE); Rickard Sjöberg, Stockholm (SE); Martin Pettersson, Vallentuna (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/841,306

(22) PCT Filed: Feb. 16, 2023

(86) PCT No.: PCT/SE2023/050140
§ 371 (c)(1),
(2) Date: Aug. 23, 2024

(87) PCT Pub. No.: WO2023/163635
PCT Pub. Date: Aug. 31, 2023

(65) Prior Publication Data
US 2025/0168364 A1       May 22, 2025

Related U.S. Application Data

(60) Provisional application No. 63/314,173, filed on Feb. 25, 2022.

(51) Int. Cl.
*H04N 19/184*       (2014.01)
*H04N 19/117*       (2014.01)
(Continued)

(52) U.S. Cl.
CPC ......... *H04N 19/184* (2014.11); *H04N 19/117* (2014.11); *H04N 19/159* (2014.11);
(Continued)

(58) Field of Classification Search
CPC .......................... H04N 19/184; H04N 19/117
(Continued)

(56) References Cited

U.S. PATENT DOCUMENTS 6,310,981 B1     10/2001   Makiyama et al.
2008/0292003 A1*   11/2008   Wang ................... H04N 19/172
                                                         375/E7.027
(Continued)

FOREIGN PATENT DOCUMENTS

EP         3298782 A1       3/2018
EP         3298782 B1 *   12/2022   ........... H04N 19/159
(Continued)

OTHER PUBLICATIONS

International Search Report and Written Opinion dated Apr. 4, 2023 in International Application No. PCT/SE2023/050140 (17 pages).
(Continued)

*Primary Examiner* — Amir Shahnami
(74) *Attorney, Agent, or Firm* — Rothwell, Figg, Ernst & Manbeck, P.C.

(57) ABSTRACT

There is provided a method for decoding a picture included in a coded video bitstream. The method comprises obtaining a computational complexity indicator indicating complexity of a computation needed for decoding the coded video bitstream and providing to a decoder the computational complexity indicator associated with the coded video bitstream, wherein the obtained computational complexity indicator is configured to be used for determining whether one or more coding tools is allowed to be used for decoding the picture.

13 Claims, 7 Drawing Sheets

(51) Int. Cl.

| | |
|---|---|
| *H04N 19/159* | (2014.01) |
| *H04N 19/51* | (2014.01) |
| *H04N 19/70* | (2014.01) |
| *H04N 19/82* | (2014.01) |

(52) U.S. Cl.
CPC .............. *H04N 19/51* (2014.11); *H04N 19/70* (2014.11); *H04N 19/82* (2014.11)

(58) Field of Classification Search
USPC .................................................... 375/240.12
See application file for complete search history.

(56) References Cited

U.S. PATENT DOCUMENTS

| | | | | |
|---|---|---|---|---|
| 2010/0278444 | A1* | 11/2010 | Amonou | H04N 19/117 |
| | | | | 382/233 |
| 2021/0092426 | A1* | 3/2021 | Choi | H04N 19/70 |
| 2021/0274199 | A1 | 9/2021 | He et al. | |
| 2021/0392331 | A1 | 12/2021 | Pfaff et al. | |

FOREIGN PATENT DOCUMENTS

| | | |
|---|---|---|
| WO | 2011084913 A2 | 7/2011 |
| WO | 2017178783 A1 | 10/2017 |

OTHER PUBLICATIONS

Sullivan, G. J. et al., "Overview of the High Efficiency Video Coding (HEVC) Standard", IEEE Transactions on Circuits and Systems for Video Technology, vol. 22, No. 12, Dec. 2012 (20 pages).

Wang, Y. et al., "The High-Level Syntax of the Versatile Video Coding (VVC) Standard", IEEE Transactions on Circuits and Systems for Video Technology, Oct. 2021 (23 pages).

Pettersson, M. et al., "AHG9: On complexity metrics for NN post-filter characteristics SEI message", Document: JVET-AB0135-v2, Joint Video Experts Team (JVET) of ITU-T SG 16 WP 3 and ISO/IEC JTC 1/SC 29, 28th Meeting, Mainz, DE, Oct. 20-28, 2022 (4 pages).

"Report of 122nd Meeting", ISO/IEC JTC 29/WG 11 doc No. N17480 Apr. 2018 (391 pages).

* cited by examiner

200 s202

Figure 2:
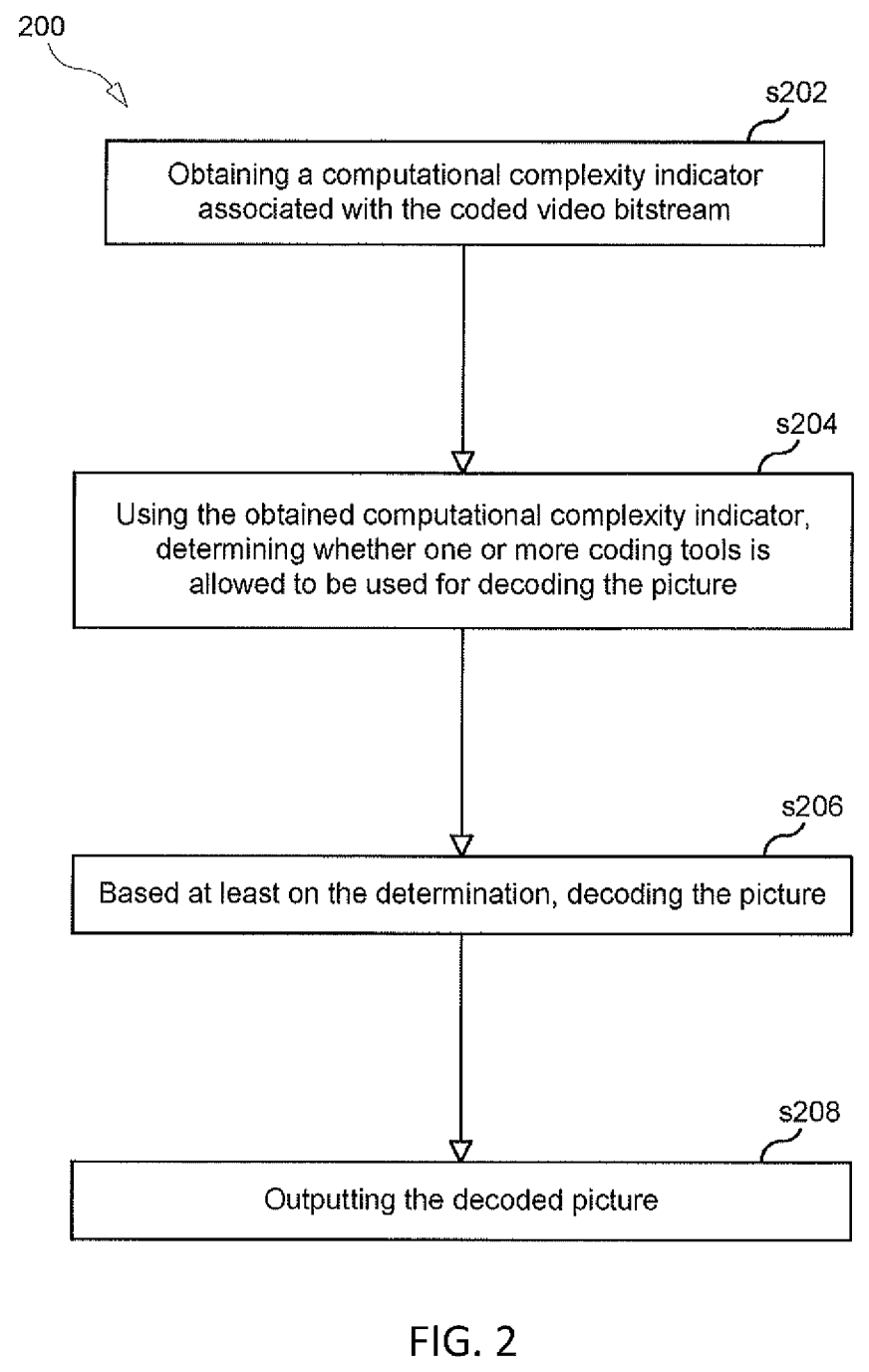

Obtaining a computational complexity indicator associated with the coded video bitstream s204

Using the obtained computational complexity indicator, determining whether one or more coding tools is allowed to be used for decoding the picture s206

Based at least on the determination, decoding the picture s208

Outputting the decoded picture

Obtaining a computational complexity indicator indicating
complexity of a computation needed for decoding
the coded video bitstream s304

Providing to a decoder the computational complexity
indicator associated with the coded video bitstream

COMPUTATIONAL COMPLEXITY INDICATOR

CROSS REFERENCE TO RELATED APPLICATIONS

This application is a 35 U.S.C. § 371 National Stage of International Patent Application No. PCT/SE2023/050140, filed 2023 Feb. 16, which claims priority to U.S. Provisional Application No. 63/314,173, filed on 2022 Feb. 25. The above identified applications are incorporated by this reference.

TECHNICAL FIELD

This disclosure relates to methods and apparatus for conveying a computational complexity indicator.

BACKGROUND

HEVC and VVC

Versatile Video Coding (VVC) and its predecessor High Efficiency Video Coding (HEVC) are block-based video codecs standardized and developed jointly by ITU-T and MPEG. The codecs utilize both temporal and spatial prediction. VVC and HEVC are similar in many aspects. Spatial prediction is achieved using intra (I) prediction from within the current picture. Temporal prediction is achieved using uni-directional (P) or bi-directional (B) inter prediction on block level from previously decoded reference pictures.

In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

The VVC version 1 specification was published as Rec. ITU-T H.266| ISO/IEC 23090-3, "Versatile Video Coding", in 2020. MPEG and ITU-T are working together within the Joint Video Exploratory Team (JVET) on updated versions of HEVC and VVC as well as the successor to VVC, i.e. the next generation video codec.

Components

A video sequence consists of a series of images where each image consists of one or more components. Each component can be described as a two-dimensional rectangular array of sample values. It is common that an image in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components.

Blocks and Units

A block is one two-dimensional array of samples. In video coding, each component is split into blocks and the coded video bitstream consists of a series of coded blocks. It is common in video coding that the image is split into units that cover a specific area of the image. Each unit consists of all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks". Alternatively, a block can be defined as a two-dimensional array that a single prediction mode is applied to. These blocks can be called "prediction blocks". In this application, the word block is not tied to one of these definitions but that the descriptions herein can apply to either definition.

Residuals, Transforms and Quantization

A residual block consists of samples that represents sample value differences between sample values of the original source blocks and the prediction blocks. The residual block is processed using a spatial transform. In the encoder, the transform coefficients are quantized according to a quantization parameter (QP) which controls the precision of the quantized coefficients. The quantized coefficients can be referred to as residual coefficients. A high QP value would result in low precision of the coefficients and thus low fidelity of the residual block. A decoder receives the residual coefficients, applies inverse quantization and inverse transform to derive the residual block.

Coding Tools

A video codec includes a set of coding tools, where a coding tool may be described as a distinct feature of the codec that typically improves compression or decreases the complexity of the decoding. Coding tools can typically be turned on or off on a sequence level, picture level and block level to balance the compression efficiency and complexity.

Examples of coding tools that are new to VVC compared to HEVC include Luma Mapping with Chroma Scaling (LMCS), Adaptive Loop Filter (ALF), Dependent Quantization (DQ), Low Frequency Non-Separable Transform (LFNST), Adaptive Motion Vector Resolution (AMVR), Decoder-side Motion Vector Resolution (DMVR), Bi-Directional Optical Flow (BDOF), Flexible block partitioning with multi-type Tree (MTT), Cross-Component Linear Model (CCLM), Intra Block Copy (IBC), Reference Picture Resampling (RPR), Matrix Based Intra Prediction (MIP), Combined Intra/Inter Prediction (CIIP) and affine motion compensation.

The next generation video codec is also expected to add a number of new coding tools compared to VVC, possibly including one or more NN-based coding tools.

NAL Units

Both VVC and HEVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in VVC and HEVC begins with a header called the NAL unit header. The syntax for the NAL unit header for HEVC starts with a forbidden_zero_bit that shall always be equal to 0 to prevent start code emulations.

Without it, some MPEG systems might confuse the HEVC video bitstream with other data, but the 0 bit in the NAL unit header makes all possible HEVC bitstreams uniquely identifiable as HEVC bitstreams. The NAL unit header in VVC is very similar to the one in HEVC, but uses 1 bit less for the nal_unit_type and instead reserves this bit for future use. The nal_unit_type, nuh_layer_id and nuh_temporal_id_plus1 code words specify the NAL unit type of the NAL unit that identifies what type of data is carried in the NAL unit, the scalability layer ID and the temporal layer ID for which the NAL unit belongs to. The NAL unit type indicates and specifies how the NAL unit should be parsed and decoded. The rest of the bytes of the NAL unit is payload of the type indicated by the NAL unit type. A bitstream consists of a series of concatenated NAL units.

Picture Unit, Access Unit and the Access Unit Delimiter

A picture unit (PU) in VVC is defined as a set of NAL units for which the VCL NAL units all belong to the same layer, that are associated with each other according to a specified classification rule, that are consecutive in decoding order, and that contain exactly one coded picture. In previous versions of VVC, the PU was called layer access unit. In HEVC, the PU is referred to as an access unit (AU).

In VVC, an access unit is a set of PUs that belong to different scalability layers and contain coded pictures associated with the same time for output from the decoded picture buffer (DPB), i.e. having the same POC value.

An access unit, in VVC, may start with an access unit delimiter (AUD) NAL unit which indicates the start of the access unit and the type of the slices allowed in the coded picture, i.e. I, I-P or I-P-B and whether the access unit is an IRAP or GDR access unit.

Temporal Sublayers

In HEVC and in VVC, all pictures are associated with a TemporalId value which specified what temporal sublayer the picture belongs to. TemporalId values are decoded from the nuh_temporal_id_plus1 syntax element in the NAL unit header. The encoder is required to set TemporalId values such that pictures belonging to a lower temporal sublayer is perfectly decodable when higher temporal sublayers are discarded.

Assume for instance that an encoder has output a bitstream using temporal sublayers 0, 1 and 2. Then removing all sublayer 2 NAL units or removing all sublayer 1 and 2 NAL units will result in bitstreams that can be decoded without problems. This is ensured by restrictions in the HEVC specification that the encoder must comply with. For instance, it is not allowed for a picture of a temporal sublayer to reference a picture of a higher temporal sublayer.

Layers and Scalability

The value of the nuh_layer_id syntax element in the NAL unit header specifies the layer ID to which the NAL unit belongs to.

A layer access unit in VVC is defined as a set of NAL units for which the VCL NAL units all have a particular value of nuh_layer_id, that are associated with each other according to a specified classification rule, that are consecutive in decoding order, and that contain exactly one coded picture.

A coded layer video sequence (CLVS) in the VVC is defined as a sequence of layer access units that consists, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated in FIG. 5.

In VVC, layers may be coded independently or dependently from each other. When the layers are coded independently, a layer with e.g. nuh_layer_id 0 may not predict video data from another layer with e.g. nuh_layer_id 1. In VVC, dependent coding between layers may be used, which enables support for scalable coding with SNR, spatial and view scalability.

Picture Header

In VVC, a coded picture contains a picture header structure. The picture header structure contains syntax elements that are common for all slices of the associated picture. The picture header structure may be signaled in its own non-VCL NAL unit with NAL unit type PH NUT or included in the slice header given that there is only one slice in the coded picture.

This is indicated by the slice header syntax element picture_header_in_slice_header_flag, where a value equal to 1 specifies that the picture header structure is included in the slice header and a value equal to 0 specifies that the picture header structure is carried in its own PH NAL unit. For a CVS where not all pictures are single-slice pictures, each coded picture must be preceded by a picture header that is signaled in its own NAL unit. HEVC does not support picture headers.

Intra Random Access Point (IRAP) Pictures and the Coded Video Sequence (CVS)

For single scalability layer coding in HEVC, an access unit (AU) is the coded representation of a single picture. An AU may consist of several video coding layer (VCL) NAL units as well as non-VCL NAL units.

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture.

A coded video sequence (CVS) in HEVC is a sequence of access units starting at an IRAP access unit followed by zero or more AUs up to, but not including the next IRAP access unit in decoding order.

IDR pictures always start a new CVS. An IDR picture may have associated random access decodable leading (RADL) pictures. An IDR picture does not have associated random access skipped leading (RASL) pictures.

BLA picture in HEVC also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not included in VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may or may not start a CVS.

In VVC, a CVS is a sequence of access units starting at a CVS start (CVSS) access unit followed by zero or more AUs up to, but not including the next CVSS access unit in decoding order. A CVSS access unit may contain an IRAP picture, i.e, an IDR or a CRA picture, or a gradual decoding refresh (GDR) picture. A CVS may contain one or more CLVSs.

GDR pictures are essentially used for random access in bitstreams encoded for low-delay coding where a full IRAP picture would cause too much delay. A GDR picture may use gradual intra refresh that updates the video picture by picture where each picture is only partially intra coded. A recovery POC count is signaled with the GDR picture that specifies when the video is fully refreshed and ready for output, given that the bitstream was tuned in at the GDR picture. A GDR picture in VVC may start a CVS or CLVS. GDR pictures are included as a normative feature in VVC but are not a normative part of the HEVC standard, where it instead may be indicated with an SEI message.

Parameter Sets

HEVC and VVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs, e.g. data for multiple scalability layers in the bitstream.

VVC version 1 also specifies one additional parameter set, the adaptation parameter set (APS). The APS carries parameters needed for the adaptive loop filter (ALF) tool, the luma mapping and chroma scaling (LMCS) tool and the scaling list tool.

Both HEVC and VVC allow certain information (e.g. parameter sets) to be provided by external means. "By external means" should be interpreted as the information is not provided in the coded video bitstream but by some other means not specified in the video codec specification, e.g. via metadata possibly provided in a different data channel, as a constant in the decoder, or provided through an API to the decoder.

Decoding Capability Information (DCI)

In VVC there is a DCI NAL unit. The DCI specifies information that don't change during the decoding session and may be good for the decoder to know about early and upfront, such as profile and level information. The information in the DCI is not necessary for operation of the decoding process. In drafts of the VVC specification the DCI was called decoding parameter set (DPS).

The decoding capability information may also contain a set of general constraints for the bitstream, that gives the decoder information of what to expect from the bitstream, in terms of coding tools, types of NAL units, etc. In VVC version 1, the general constraint information (GCI) can be signaled in the DCI, VPS or SPS.

The OLS and OPI

The VPS in VVC contains scalability layer information that is needed for handling scalable bitstreams. For VVC single-layer bitstreams, the VPS is optional so in those bitstreams the VPS may or may not be present. For HEVC, a VPS must be present for all bitstreams, even single-layer ones. The VPS defines output layer sets (OLS), where an OLS is a set of layers in the bitstream and indications of which of the layers in the OLS that should be output.

In VVC, only the output layers are specified and the full OLS is derived by using bitstream information for how layers reference other layers. This means that the full OLS is decodable even if all layers that are not included in the OLS are discarded. In other word, no layer in an OLS depend on any layer not in the OLS. This also means that some OLS layers may be required to be decoded but no pictures of those layers are output.

An operation point in VVC is defined as a temporal subset of an OLS, identified by an OLS index and a highest value of TemporalId. The operation point information (OPI) in VVC can be used to specify the OLS index of the target OLS for the decoder to decode. The OPI may additionally specify the highest temporal sublayer the decoder should decode. When a bitstream contains many layers and sublayers, the OPI can be useful to tell a decoder what parts of the bitstream to decode and/or what temporal sublayers that should be discarded when decoding.

The target OLS and highest temporal sublayer to decode can alternatively be specified by external means. If that happens and there is an OLS in the bitstream, the decoder should use the information provided by external means and ignore the OLS information. The OPI is signaled in its own non-VCL NAL unit in VVC.

SEI Messages

Supplementary Enhancement Information (SEI) messages are codepoints in the coded bitstream that do not influence the decoding process of coded pictures from VCL NAL units. SEI messages usually address issues of representation/rendering of the decoded bitstream. The overall concept of SEI messages and many of the messages themselves have been inherited from the H.264 and HEVC specifications into the VVC specification. In VVC, an SEI RBSP contains one or more SEI messages.

SEI messages assist in processes related to decoding, display or other purposes. However, SEI messages are not required for constructing the luma or chroma samples by the decoding process. Some SEI messages are required for checking bitstream conformance and for output timing decoder conformance. Other SEI messages are not required for checking bitstream conformance. A decoder is not required to support all SEI messages. Usually, if a decoder encounters an unsupported SEI message, it is discarded.

ITU-T H.274| ISO/IEC 23002-7, also referred to as VSEI, specifies the syntax and semantics of SEI messages and is particularly intended for use with VVC, although it is written in a manner intended to be sufficiently generic that it may also be used with other types of coded video bitstreams. The first version of ITU-T H.274| ISO/IEC 23002-7 was finalized in July 2020. At the time of writing, version 2 is under development.

Slices

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of CTUs.

In VVC, a slice is defined as an integer number of complete tiles or an integer number of consecutive complete CTU rows within a tile of a picture that are exclusively contained in a single NAL unit. In VVC, a picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice has a slice header comprising syntax elements. Decoded slice header values from these syntax elements are used when decoding the slice. Each slice is carried in one VCL NAL unit.

In an early draft of the VVC specification, slices were referred to as tile groups.

Tiles

The VVC video coding standard includes a tool called tiles that divides a picture into rectangular spatially independent regions. Tiles in VVC are similar to the tiles used in HEVC. Using tiles, a picture in VVC can be partitioned into rows and columns of CTUs where a tile is an intersection of a row and a column.

Subpictures

Subpictures are supported in VVC where a subpicture is defined as a rectangular region of one or more slices within a picture. This means a subpicture contains one or more slices that collectively cover a rectangular region of a picture. In the VVC specification subpicture location and size are signaled in the SPS. Boundaries of a subpicture region may be treated as picture boundaries (excluding in-loop filtering operations) conditioned to a per-subpicture flag subpic_treated_as_pic_flag[i] in the SPS. Also loop-filtering on subpicture boundaries is conditioned to a per-subpicture flag loop_filter_across_subpic_enabled_flag[i] in the SPS.

Picture Order Count (POC)

Pictures in HEVC are identified by their picture order count (POC) values, also known as full POC values. Each slice contains a code word, pic_order_cnt_lsb, that shall be the same for all slices in a picture. pic_order_cnt_lsb is also known as the least significant bits (lsb) of the full POC since it is a fixed-length code word and only the least significant bits of the full POC is signaled. Both encoder and decoder keep track of POC and assign POC values to each picture that is encoded/decoded.

The pic_order_cnt_lsb can be signaled by 4-16 bits. There is a variable MaxPicOrderCntLsb used in HEVC which is set to the maximum pic_order_cnt_lsb value plus 1. This means that if 8 bits are used to signal pic_order_cnt_lsb, the maximum value is 255 and MaxPicOrderCntLsb is set to $2^8=256$. The picture order count value of a picture is called PicOrderCntVal in HEVC. Usually, PicOrderCntVal for the current picture is simply called PicOrderCnt Val.

Reference Picture Management

Reference picture management in HEVC is done using reference pictures sets (RPS). The reference picture set is a set of reference pictures that is signaled in the slice headers. When the decoder has decoded a picture, it is put together with its POC value in a decoded picture buffer (DPB). When decoding a subsequence picture, the decoder parses the RPS syntax from the slice header and constructs lists of reference picture POC values.

The reference picture management in the VVC specification differ slightly from the one in HEVC. In HEVC, the RPS is signaled and the reference picture lists to use for Inter prediction is derived from the RPS. In the VVC specification, the reference pictures lists (RPL) are signaled and the RPS is derived. However, in both specifications, signaling of what pictures to keep in the DPB, what pictures should be short-term and long-term is done. Using POC for picture identification and determination of missing reference pictures is done the same in both specifications.

Profiles, Tiers and Levels

A profile in HEVC and VVC is defined as a specified subset of the syntax of the specification.

VVC version 1 comprises the Main 10 profile, the Main 10 Still Picture profile, the Main 10 4:4:4 profile, the Main 10 4:4:4 Still Picture profile, the Multilayer Main 10 profile and the Multilayer Main 10 4:4:4 profile where the 10 indicates support of a bitdepth of 10 bits per pixel and 4:4:4 indicates support of 4:4:4 chroma sampled pixels.

The Main 10, the Main 10 4:4:4 profile, the Multilayer Main 10 profile and the Multilayer Main 10 4:4:4 profile are video profiles while the Main 10 Still Picture and the Main 10 4:4:4 Still Picture profiles are still picture profiles. With the multilayer profiles scalability and multi-view coding is supported directly in version 1, which was not the case for the first version of HEVC. In version 2 of VVC a number of range extension profiles will be added for support of higher bit-depths. HEVC comprises similar profiles as VVC.

HEVC and VVC define a level as a "defined set of constraints on the values that may be taken by the syntax elements and variables of this Specification". The same set of levels is defined for all profiles, with most aspects of the definition of each level being in common across different profiles. Individual implementations may, within specified constraints, support a different level for each supported profile.

HEVC and VVC define a tier as a specified category of level constraints imposed on values of the syntax elements in the bitstream. The level constraints are nested within a tier. A bitstream in HEVC and VVC is said to conform to the specification at a specific profile, tier and level, where the profile, tier and level are signaled in the PTL structure in the bitstream. A decoder conforming to a certain tier and level is capable of decoding all bitstreams that conform to the same tier or the lower tier of that level or any level below it. In both HEVC and VVC, the level is signaled in the profile_tier_level( ) syntax structure by the 8-bit syntax element general_level_idc and the tier is signalled in the same syntax structure by a 1-bit flag general_tier_flag.

The table provided below shows the general limits for each level of each tier in VVC version 1.

| Level | general_level_idc value* | Max luma picture size MaxLumaPs (samples) | Max CPB size MaxCPB (Cpb VclFactor or CpbNalFactor bits) | | Max slices per AU MaxSlicesPerAu | Max # of tiles MaxTilesPerAu | Max # of tile columns MaxTileCols |
|---|---|---|---|---|---|---|---|
| | | | Main tier | High tier | | | |
| 1.0 | 16 | 36 864 | 350 | — | 16 | 1 | 1 |
| 2.0 | 32 | 122 880 | 1 500 | — | 16 | 1 | 1 |
| 2.1 | 35 | 245 760 | 3 000 | — | 20 | 1 | 1 |
| 3.0 | 48 | 552 960 | 6 000 | — | 30 | 4 | 2 |
| 3.1 | 51 | 983 040 | 10 000 | — | 40 | 9 | 3 |
| 4.0 | 64 | 2 228 224 | 12 000 | 30 000 | 75 | 25 | 5 |
| 4.1 | 67 | 2 228 224 | 20 000 | 50 000 | 75 | 25 | 5 |
| 5.0 | 80 | 8 912 896 | 25 000 | 100 000 | 200 | 110 | 10 |
| 5.1 | 83 | 8 912 896 | 40 000 | 160 000 | 200 | 110 | 10 |
| 5.2 | 86 | 8 912 896 | 60 000 | 240 000 | 200 | 110 | 10 |
| 6.0 | 96 | 35 651 584 | 80 000 | 240 000 | 600 | 440 | 20 |

-continued

| | | Max luma picture size MaxLumaPs | Max CPB size MaxCPB (Cpb VclFactor or CpbNalFactor bits) | | Max slices per AU | Max # of tiles | Max # of tile columns |
|---|---|---|---|---|---|---|---|
| Level | general_level_idc value* | (samples) | Main tier | High tier | MaxSlicesPerAu | MaxTilesPerAu | MaxTileCols |
| 6.1 | 99 | 35 651 584 | 120 000 | 480 000 | 600 | 440 | 20 |
| 6.2 | 102 | 35 651 584 | 180 000 | 800 000 | 600 | 440 | 20 |

*The level numbers in this table are in the form of "majorNum.minorNum", and the value of general_level_idc for each of the levels is equal to majorNum * 16 + minorNum * 3.

In VVC version 1, some profile-specific level limits are specified on top of the general tier and level limits specified in the table provided above. For instance, the tier and level limits for video profiles (Main 10, Main 10 4:4:4, Multilayer Main 10, and Multilayer Main 10 4:4:4 profiles) in VVC version 1 are specified as in the table provided below.

The table below shows tier and level limits for the video profiles in VVC version 1.

| | Max luma sample rate | Max bit rate MaxBR (BrVclFactor or BrNalFactor bits/s) | | Min compression ratio MinCrBase | |
|---|---|---|---|---|---|
| Level | MaxLumaSr (samples/sec) | Main tier | High tier | Main tier | High tier |
| 1.0 | 552 960 | 128 | — | 2 | 2 |
| 2.0 | 3 686 400 | 1 500 | — | 2 | 2 |
| 2.1 | 7 372 800 | 3 000 | — | 2 | 2 |
| 3.0 | 16 588 800 | 6 000 | — | 2 | 2 |
| 3.1 | 33 177 600 | 10 000 | — | 2 | 2 |
| 4.0 | 66 846 720 | 12 000 | 30 000 | 4 | 4 |
| 4.1 | 133 693 440 | 20 000 | 50 000 | 4 | 4 |
| 5.0 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6.0 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 8 | 4 |

MPEG Systems and Relevant Specifications

The MPEG systems group in MPEG develops systems standards for storing, transporting and presenting compressed media, including traditional video such as single layer HEVC and VVC encoded bitstreams, and immersive audio and video including 360 video and point clouds. This includes packetizing the compressed media, attaching appropriate metadata and make relevant information available to the systems and application layers, including network nodes and media players. Standards developed by the MPEG systems group relevant for this invention include the following specifications.

ISO Base Media File Format

The ISO Base Media File Format (ISOBMFF) specified in ISO/IEC 14496-12 defines a base file structure for storing and transporting media, including audio and video. A file based on the ISOBMFF has a logical structure with a so-called movie comprising one or more time-parallel tracks where each track is a media stream. The tracks contain sequences of samples in time, where each sample can have a decoding time, a composition time and a presentation time.

For video, a sample corresponds to a picture. Each track has a specific media type (audio, video, etc), and is further parameterized by a sample entry, including the identifier of the media type used (e.g. the video codec). Each sample in a track may be associated with a sample group, where a sample group is grouping samples with a specific property, e.g. all samples in the group being random access samples. The physical structure of an ISOBMFF file is a series of specific defined boxes (sometimes called atoms), in a hierarchical setup, with the boxes describing the properties of the media for the movie and for each track. Each box has a length, type, flags and data. The media data for the samples, e.g., the compress video bitstream, is stored unstructured in 'mdat' or 'idat' boxes in the same file or in a separate file.

Many of the MPEG systems specifications inherits structures and boxes from ISOBMFF, including MPEG-DASH, Carriage of NAL unit structured video in the ISOBMFF, Omnidirectional Application Format (OMAF) and the Carriage of PCC data.

Carriage of NAL Unit Structured Video in the ISOBMFF

The Carriage of NAL unit structured video in the ISOBMFF specified in ISO/IEC 14496-15 specifies the storage format for video streams encoded with AVC, HEVC and VVC. This includes definitions of how to derive from the ISOBMFF, the sample groups to use for the different random access types, entity groups to be used for subpictures and operating points, and how to packetize layers into different tracks. This specification is used by other MPEG specifications for carriage of video data compressed with AVC, HEVC, and VVC, including MPEG-DASH and carriage of PCC data.

MPEG-DASH

MPEG-DASH (Dynamic Adaptive Streaming over HTTP) specified in ISO/IEC 23009 is an adaptive bitrate streaming technology where a multimedia file is partitioned into one or more segments and delivered to a client using HTTP, typically over TCP. MPEG-DASH may sometimes be referred to as only DASH. DASH may also refer to the reduced version of MPEG-DASH promoted by the DASH Industry Forum (IF). An MPEG-DASH session is set up using a media presentation description (MPD) that describes segment information including timing, URL and media characteristics like video resolution and bit rates.

MPDs, which are XML-based, can be static, e.g. for movies, or dynamic, such as for live content. Segments can contain any media data, however the specification provides specific guidance and formats for use with two types of containers: ISO base media file format or MPEG-2 Transport Stream. One or more representations of multimedia files, e.g., versions at different resolutions or bit rates, are typically available, and selection can be made based on network conditions, device capabilities and user preferences, enabling adaptive bitrate streaming.

Within the root MPD element is one or more Period elements. A Period represents a window of time in which media is expected to be presented. Each Period contains one or more AdaptationSet elements. An AdaptationSet describes a single media element available for selection in the presentation. A reason to use multiple AdaptationSets is when there are multiple copies of the media that use different video codecs, which would enable playback on clients that only support one codec or the other. Also, clients may want to be able to select between multiple language audio tracks or between multiple video viewpoints.

An AdaptationSet contains one or more Representations. Every AdaptationSet contains a Representation element for each quality-level (bandwidth value) of media available for selection where different video resolutions and bitrates may be available for selection. A Representation may also have Sub-Representations valid for a shorter time period than the representation. Elements and attributes in the AdaptationSet, Representation and Sub-Representation include the codecs and ptl elements and attributes for defining the codecs settings for the session. The structure of the MPD is exemplified in FIG. 6.

Another popular protocol used in adaptive video streaming is the HTTP Live Streaming (HLS) protocol developed by Apple. HLS resembles MPEG-DASH in that it works by breaking the overall stream into a sequence of small HTTP-based file downloads, each downloading one short chunk of an overall potentially unbounded transport stream. A list of available streams, encoded at different bit rates, is sent to the client using an extended M3U playlist.

Although MPEG-DASH and HLS are very similar they are not compatible by their own, meaning that a service provider wanting to support both formats would have to be able to deliver content for each of the two container formats. In an effort to alleviate this market fragmentation and simplify adaptive video streaming, MPEG has developed the Common Application Media Format (CMAF), ISO/IEC 23000-19, which defines a common subset of the MPEG-DASH and HLS formats using the ISO base media container format, such that a service provider would only need to be able to deliver content for a single container format, which will save costs and reduce time-to-market.

The Real-Time Messaging Protocol (RTMP) from Macromedia and the open-source Secure Reliable Transport (SRT) are two other video transport protocols used in the market.

Media Transport in IETF

The Internet Engineering Task Force (IETF) have developed a number of protocols for media transport and media session setup. Some of these protocols are described below.

Real-Time Transport Protocol

The Real-time Transport Protocol (RTP) specified in RFC 3550 is a network protocol for sending audio and video over IP networks. RTP is typically used in communication and entertainment systems that involve streaming media, such as telephony, video teleconference applications including WebRTC, IPTV and web-based push-to-talk features. RTP is typically run over User Datagram Protocol (UDP) and often together with the RTP Control Protocol (RTCP) that monitors transmission statistics and quality of service (QoS).

The information provided by RTP includes timestamps (for synchronization), sequence numbers (for packet loss and reordering detection) and the payload format which indicates the encoded format of the data. The Real-Time Streaming protocol (RTSP) is a network protocol used for controlling streaming media servers. Media clients sends commands such as play, skip and pause to the media server to facilitate control of media streaming from the server to the client, also referred to as Video on Demand.

RTP is designed to carry a multitude of multimedia formats, which permits the development of new formats without revising the RTP standard. RTP therefore defines profiles and associated payload formats. Examples of RTP profiles include the RTP Profile for Audio and Video (RTP/AVP) specified in RFC 3551 and the Secure Real-time Transport Protocol (SRTP) for encrypting transfer of payload data specified in RFC 3711. RTP payload formats specify how certain media formats, e.g. media encoded with certain codecs, are packetized and transported. RTP payload formats have been specified for a number of audio, video and picture codecs, including H.264 (RFC 6184), HEVC (RFC 7798), JPEG (RFC 2435) and JPEG XS (RFC 9134). The development of the RTP payload format for VVC is ongoing in IETF.

Session Description Protocol

The Session Description Protocol (SDP) specified in RFC 8866 is a format for describing multimedia communication sessions for the purposes of setting up a connection. Its predominant use is in support of streaming media applications, such as voice over IP (VOIP) and video conferencing. SDP does not deliver any media streams itself but is used between endpoints for negotiation of network metrics, media types, and other associated properties. The set of properties and parameters is called a session profile. SDP is typically used in conjunction with RTP, RTSP, the Session Initiation Protocol (SIP), and as a standalone protocol for describing multicast sessions.

The session descriptions in SDP consists of three sections: session, timing and media description. An example of an SDP session description is shown below, where the media description (the rows with the a and m characters) describes that the media can only be received, the audio is sent on port 49170 and encoded with PCMU (payload type 0) and the video is sent on port 51372 and encoded with H.265.

```
v=0
    o=jdoe 2890844526 2890842807 IN IP4 10.47.16.5
    s=sessionName
    t=0 0
    a=recvonly
    m=audio 49170 RTP/AVP 0
    m=video 51372 RTP/AVP 98
    a=rtpmap:98 H265/90000
    a=fmtp:98 profile-id=1;
        sprop-vps=<video parameter sets data>
```

The SDP offer/answer model, first specified in RFC 3264 and later updated in RFC 8843, uses SDP to negotiate a common view of a multimedia session between two participants. In the model, one participant offers the other a description of the desired session from their perspective, and the other participant answers with the desired description of the session from their perspective. To be more precise, one participant in the session generates an SDP message that constitutes the offer—the set of media streams and codecs the offerer wishes to use, along with the IP addresses and ports the offerer would like to use to receive the media.

The offer is conveyed to the other participant, called the answerer. The answerer generates an answer, which is an SDP message that responds to the offer provided by the offerer. The answer has a matching media stream for each stream in the offer, indicating whether the stream is accepted or not, along with the codecs that will be used and the IP addresses and ports that the answerer wants to use to receive media. When a session description can be agreed upon, the session can be setup and the media exchange can start.

Secure FRAME

IETF is currently working on the Secure FRAME (SFRAME), an end-to-end encryption and authentication mechanism for media frames in a multiparty conference call, where central media servers (SFUs) can access the media metadata needed to make forwarding decisions without having access to the actual media data. SFRAME is intended to be used with or without RTP. When used with RTP it is proposed to use a generic RTP payload type such that the media information and the RTP payload header can be encrypted.

WebRTC

WebRTC is an API for web programming supporting real-time communication (RTC) between web browsers and mobile applications in for instance video conferencing. Originally developed by Google, it has been adopted as an industry standard by W3C and IETF. The RTCPeerConnection component enables audio and video communication between peers and performs signal processing, codec handling, peer-to-peer communication, security, and bandwidth management.

Neural Networks

The recent advances in neural network (NN) technology have led to ground-breaking discoveries within a large number of application areas, including finance, marketing, image detection and classification, which has resulted in an explosion of interest in the technology. The video coding community is no exception. JVET is currently conducting experiments on video coding using NN technology for the next generation video coding.

A neural network model is built up of a number of connected nodes (neurons) distributed over a number of layers. In the first layer the data to be processed is input and in the last layer the processed data is output. The intermediate layers comprise of various types of layers including convolutional layers, pooling layers, dropout layers, flatten layers and fully connected layers. Each node in the NN model has its own weight used to amplify the value from the previously connected nodes.

FIG. 7 shows an example picture of a NN model with 4 layers including an input, an output and two intermediate layers with a total of 18 nodes.

Neural Networks for Image and Video Compression

Neural-network-based techniques for image and video coding and compression have been explored especially after introduction of convolutional neural networks (CNNs) which provide a reasonable trade-off between the number of the neural network model parameters and trainability of the neural network model. CNNs have a smaller number of parameters compared to fully connected neural networks which makes the large-scale neural network training possible.

There are two technological development tracks for using neural networks for image and video compression: One track is integrating neural networks into an existing codec by replacing one or more of the modules in the existing block-based image and video coding standards with a neural network model to improve the coding efficiency, and another track is the end-to-end track which replaces the entire codec with a neural network module with the possibility for end-to-end training and optimization. Both tracks are currently being explored in the scientific community.

However, it is the codec standardization activities for image compression (rather than video compression) that is exploring the end-to-end track in a more structures way, including the ongoing activities in JPEG AI, while the ongoing video compression standardization activities are investigating the module replacement track in a more structured way, including the ongoing activities in the EE1 in JVET. One reason for this is the considerably higher complexity of the end-to-end video codecs compared to the image codecs. Another reason is that the scientific community has so far been more successful in handling image data with end-to-end approaches rather than handling motion data. More information about neural-network-based video coding activities in JVET are provided in the following section.

Neural-Network-Based Video Coding Activities in JVET

In the $19^{th}$ JVET meeting, it was agreed (JVET-S2000) to establish an ad-hoc group (AHG) with the goal of developing a potential VVC extension supporting learning-based video coding tools. Following this decision, neural-network-based video coding (AHG11) was established with the following initial mandates:

(1) Study potential extensions of VVC with NN-based coding tools for video coding, such as intra or inter prediction modes, partitioning, transforms, and in-loop or post filtering.

(2) Study NN-based encoding optimization for VVC.

(3) Study the impact of training on the performance of candidate technology.

(4) Analyze complexity characteristics and perform complexity analysis of candidate technology.

(5) Identify video test materials, training set materials, and testing methods for assessment of the effectiveness and complexity of considered tools.

(6) Develop reporting templates for test results and analysis of candidate technology.

(7) Coordinate with relevant activities of the parent bodies.

AHG11 was a follow up to the AHG9 for investigating the compression performance and complexity of neural network-based coding tools which was set up in early 2018 and continued for several meeting cycles until after the P meeting, as it was necessary to prioritize work on other aspects of the VVC design to finalize the VVC v1 standard on time.

In the $20^{th}$ JVET meeting an exploration experiment (EE) on neural-network-based video coding was established. This EE was continued in the $21^{st}$ up to the $25^{th}$ (the most recent) JVET meetings with several EE tests including tests on NN-based filtering and NN-based super resolution between the $20^{th}$ and the $23^{rd}$ JVET meetings, and tests on NN-based enhancement filters, NN-based super resolution and NN-based intra prediction after the $23^{rd}$ JVET meeting.

Here are some of the items on the list of the mandates for neural-network-based video coding ad-hoc group in JVET from JVET-X1000 ($24^{th}$ JVET meeting):

(1) Evaluate and quantify performance improvement potential of NN-based video coding technologies compared to existing video coding standards such as VVC, including both individual coding tools and novel architectures.

(2) Finalize, conduct and discuss the EE on neural network-based video coding.

(3) Refine the test conditions for NN-based video coding. Generate and distribute anchor encoding, and develop supporting software as needed.

(4) Investigate technical aspects specific to NN-based video coding, such as encoding and decoding complexity of neural networks, design network representation, operation, tensor, on-the-fly network adaption (e.g. updating during encoding) etc;

(5) Study the impact of training (including the impact of loss function) on the performance of candidate technology, and identify suitable materials for training.

(6) Analyse complexity characteristics, perform complexity analysis, and develop complexity reductions of candidate technology.

(7) Refine testing methods for assessment of the effectiveness and complexity of considered technology.

(8) Study the impact of parameter quantization and fixed-point computations in NN-based video coding.

(9) Study and collect information related to near-term and longer-term architectures for neural network-based video coding.

The above list includes more items and more detailed items compared to the initial list of mandates which hints at the growing interest and level of investigation in the neural-network-based video coding ad-hoc group in JVET. Complexity-performance tradeoff analysis has been a main objective from the start of the exploration experiment on neural-network-based video coding and complexity related aspects of the neural networks for video coding such as encoding and decoding complexity of neural networks, analysis of the complexity characteristics and complexity reduction for the considered technologies are among the highlighted topics for investigation on the list of neural-network-based video coding ad-hoc group mandates.

SUMMARY

The profile, tier, and level (PTL) mechanism may be used to allow or disallow the usage of one or more coding tools based on the computational complexity of the one or more coding tools and a chosen complexity level. One problem of such use of the PTL mechanism is that the use of the PTL mechanism lacks flexibility in the sense that it does not handle the case of a coding tool having more than one level of computational complexity.

For instance, the current PTL mechanism can allow or disallow a certain coding tool T with computational complexity C for a certain profile, tier, and level. But the current PTL mechanism has limitations when there are multiple instances of this coding tool, for example, instance T1 with computational complexity C1, instance T2 with computational complexity C2, and instance T3 with computational complexity C3 and when one or more of these three instances are required to be allowed if each of their computational complexities is less than a threshold value.

The existing mechanism does not provide a thresholding mechanism for allowing or disallowing a coding tool with more than one level of computational complexity where each level of computational complexity can provide different trade-offs between coding efficiency and the hardware and software demand for realization of the coding tools. This issue is more apparent with emerging neural network (NN)-based solutions for image and video coding where one coding tool can be implemented using a number of NN-based solutions with a very wide range of trade-offs between coding efficiency and computational complexity.

Another challenge with the existing mechanism is that in case the complexity of a certain coding tool T1 is too high for a high-quality video sequence (e.g., an 8K video sequence) but is an acceptable complexity for a lower-quality video sequence (e.g., an 4K video sequence, an High Definition (HD) video sequence, a video sequence with a resolution lower than HD), the coding tool T1 is disallowed even for the lower-quality video sequences.

Also, in case there are more than one available coding tool each of which is provided with more than one trade-off between a computational complexity and a coding efficiency, the existing PTL lacks the mechanism for allowing or disallowing combinations of these coding tools.

Accordingly, in some embodiments of this disclosure, coding tools with various computational complexities can be used to provide different trade-offs between a coding efficiency vs hardware and software demand for the realization of the coding tools. For example, in some embodiments, a restriction mechanism may be defined on top of the existing PTL mechanism. This additional restriction mechanism may be used to allow or disallow the usage of one or more coding tool(s) based on the computational complexity of the one or more coding tool(s) and a chosen complexity level. A computational complexity indicator indicating the chosen complexity level may be signaled in a bitstream, and whether the usage of one or more coding tool(s) will be allowed or disallowed may be determined based on the relation between the computational complexity indicator and one or more threshold values.

In one aspect, there is provided a method for decoding a picture included in a coded video bitstream. The method comprises obtaining a computational complexity indicator indicating complexity of a computation needed for decoding the coded video bitstream; and providing to a decoder the computational complexity indicator associated with the coded video bitstream. The obtained computational complexity indicator is configured to be used for determining whether one or more coding tools is allowed to be used for decoding the picture.

In some embodiments, determining whether one or more coding tools is allowed to be used for decoding the picture comprises determining if any one of a plurality of conditions is satisfied based on the obtained computational complexity indicator, each of the plurality of conditions is associated with each of the coding tools, and based on determining that a condition included in the plurality of conditions is satisfied, selecting a coding tool associated with the satisfied condition for decoding the picture.

In another aspect, there is provided a computer program comprising instructions which, when executed by processing circuitry, cause the processing circuitry to perform the method of any one of the embodiments described above.

In another aspect, there is provided an apparatus for decoding a picture included in a coded video bitstream. The apparatus is configured to obtain a computational complexity indicator indicating complexity of a computation needed for decoding the coded video bitstream; and provide to a decoder the computational complexity indicator associated with the coded video bitstream. The obtained computational complexity indicator is configured to be used for determining whether one or more coding tools is allowed for decoding the picture.

In another aspect, there is provided an apparatus. The apparatus comprises a memory; and processing circuitry coupled to the memory, wherein the apparatus is configured to perform the method of any one of the embodiments described above.

Embodiments of this disclosure provide a thresholding mechanism which allows choosing more flexible trade-off between computational complexity and coding efficiency of coding tools as compared to the existing method based on PTL. For example, as explained above, there may be a scenario where the complexity of a certain coding tool T1 may be too high for an 8K video sequence while it can be an acceptable complexity for a 4K, HD, or lower resolution video sequence. In such scenario, a restriction mechanism according to some embodiments allows the usage of T1 for 4K, HD, or lower resolution video sequences while disallows the usage of T1 for 8K video sequences. This cannot be achieved in the existing mechanism in which if a certain coding tool is disallowed for 8K videos, then it is also disallowed for the lower video resolution videos.

BRIEF DESCRIPTION OF THE DRAWINGS

The accompanying drawings, which are incorporated herein and form part of the specification, illustrate various embodiments.

FIG. 2 shows a process according to some embodiments.

DETAILED DESCRIPTION

The following terminologies are used in the description of the embodiments below:

Neural network: a generic term for an entity with multiple layers of simple processing units called neurons or nodes having activation functions and interacting with each other via weighted connections and biases, which collectively create a tool in the context of non-linear transforms.

Neural network architecture, network architecture, or architecture in short: the layout of a neural network describing the placement of the nodes and their connections, usually in the form of several interconnected layers, and may also specify the dimensionality of the input(s) and output(s) as well as the activation functions for the nodes.

Neural network weights, or weights in short: The weight values assigned to the connections between the nodes in a neural network.

Neural network model, or model in short: a transform in the form of a trained neural network. A neural network model may be specified as the neural network architecture, activation functions, biases and weights.

Filter: A transform. A neural network model is one realization of a filter. The term filter may be used as a short form of neural-network-based filter or neural network filter.

Neural network training, or training in short: The process of finding the values for the weights and biases for a neural network. Usually, a training data set is used to train the neural network and the goal of the training is to minimize a defined error. The amount of training data needs to be sufficiently large to avoid overtraining. Training a neural network is normally a time-consuming task and typically comprises a number of iterations over the training data, where each iteration is referred to as an epoch.

Allowed to be used: In the description of the embodiments, the expression "allowed to be used" is used in the context of whether a coding tool is allowed to be used. This is equivalent to saying that the coding tool is enabled or saying that the coding tool may/could be present. Similarly, when using the term "not allowed to be used" or "disallowed" for a coding tool, it is equivalent to saying that the coding tool is disabled or saying that the coding tool is not present.

The following embodiments capture different elements which may be used individually or as a combination.

Figure 1A:
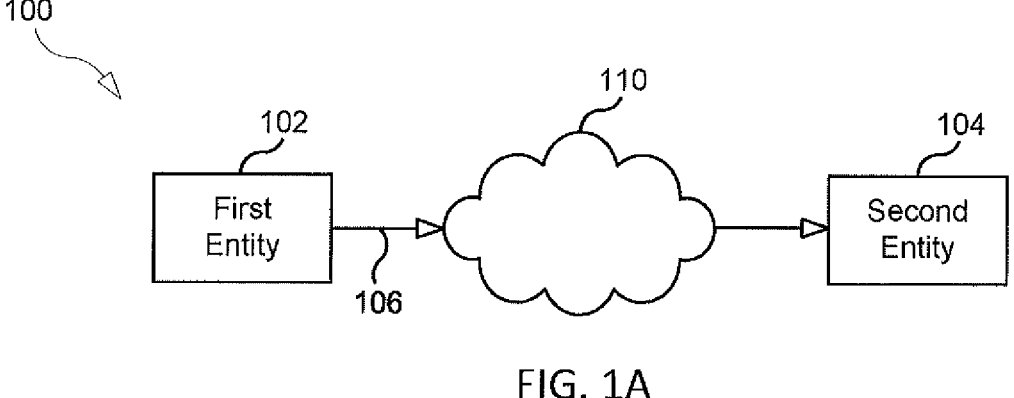
FIG. 1A shows a system according to some embodiments.

FIG. 1A shows a system 100 according to some embodiments. The system 100 comprises a first entity 102, a second entity 104, and a network 110. The first entity 102 is configured to convey towards the second entity 104 encoding and/or decoding information (herein after, "e/d info") 106 for at least one video bitstream or at least one video coding operation point.

In some embodiments, the first entity 102 is any computing device (e.g., a network node such as a server) capable of transmitting a video stream (a.k.a., "a video bitstream," "bitstream," "an encoded video") towards the second entity 104 via the network 110. Similarly, in some embodiments, the second entity 104 is any computing device (e.g., a network node) capable of receiving the transmitted video stream.

For example, the first entity 102 is a content providing server configured to store various video contents, encode the video contents, and transmit the encoded video contents towards the second entity 104. In another example, the first entity 102 is a content delivery server that is capable of obtaining various encoded video contents from a content storage entity and delivering the encoded video contents to the second entity 104.

In case the second entity 104 includes a decoder, the second entity 104 is configured to decode the received video stream. In case the second entity 104 does not include any decoder, the second entity 104 may be configured to forward the received video stream towards a decoder.

As discussed above, in some embodiments, the first entity 102 is capable of transmitting a video stream towards the second entity 104. However, in other embodiments, the first entity 102 is not capable of transmitting a video stream towards the second entity 104. In such embodiments, the first entity 102 merely provides the e/d info 106 to the second entity 104.

The first entity 102 may be a single physical entity or a combination of multiple physical entities. The multiple physical entities may be located in the same location or may be distributed in a cloud.

Figure 1B:
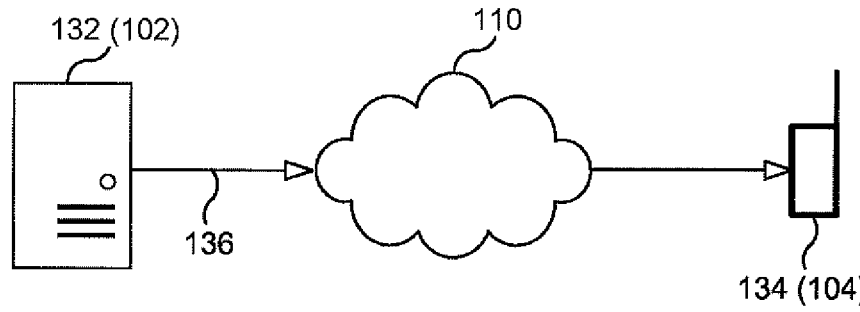
FIG. 1B shows a system according to some embodiments.

As shown in FIG. 1B, in some embodiments, the first entity 102 is a video streaming server 132 and the second entity 104 is a user equipment (UE) 134. The UE 134 may be any of a desktop, a laptop, a tablet, a mobile phone, or any other computing device. The video streaming server 132 is capable of sending a video bitstream 136 (e.g., YouTube™ video streaming) to the video streaming client 134.

Figure 1C:
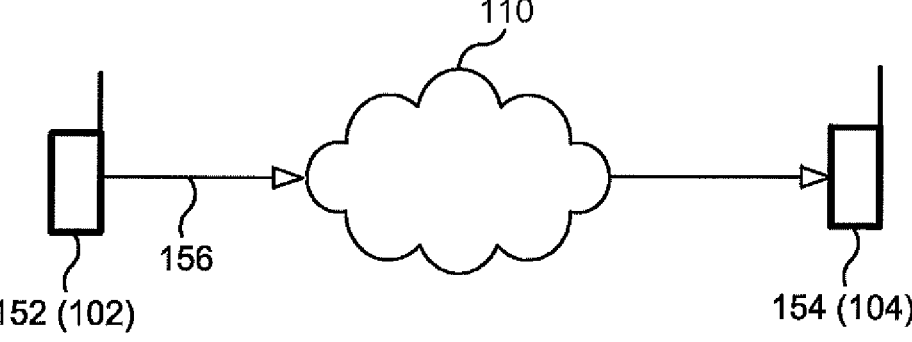
FIG. 1C shows a system according to some embodiments.

As shown in FIG. 1C, in other embodiments, the first entity 102 and the second entity 104 are first and second UEs 152 and 154. For example, the first UE 152 may be an offeror of a video conferencing session or a caller of a video chat and the second UE 154 may be an answerer of the video conference session or the answerer of the video chat. In the embodiments shown in FIG. 1C, the first UE 152 is capable of sending a video bitstream 156 for a video conference (e.g., Zoom™, Skype™, MS Teams™, etc.) or a video chat (e.g., Facetime™) to the second UE 154.

Referring back to FIG. 1A, the e/d info 106 may include a computational complexity indicator value indicating a degree of complexity related to one or more coding tools. For example, the complex indicator value may indicate a degree of complexity needed for decoding a video bitstream using the one or more coding tools.

According to some embodiments of this disclosure, restrictions on the usage of one or more coding tools for coding a video (e.g., decoding a coded video bitstream) may be determined based on a computational complexity indicator value and/or a relation of the computational complexity indicator value to one or more threshold values.

The computational complexity indicator value may indicate a degree of complexity related to one or more coding tools. In some embodiments, the computational complexity indicator is a video codec level.

The one or more coding tools are tools for coding (e.g., encoding and/or decoding) a video. In some embodiments, the one or more coding tools comprise one or more neural network (NN) models. More specifically, in one example, the one or more coding tools comprise one or more NN models used for in-loop filtering, which have different degrees of trade-offs between computational complexity and compression efficiency. In another example, the one or more coding tools comprise one or more NN models used for intra prediction. In a different example, the one or more coding tools comprise one or more NN models used for motion compensation. In a different example, the one or more coding tools comprise one or more NN models used for any one or more of in-loop filtering, intra prediction, and motion compensation.

In some embodiments, there may be provided a profile P1 which includes three NN models for in-loop filtering—NIF1, NIF2, and NIF3 which have different degrees of trade-offs between the computational complexity and the compression efficiency. The computational complexity of NIF3 may be smaller than the computational complexity of NIF2, and the computational complexity of NIF2 may be smaller than the computational complexity of NIF1.

In some embodiments, a computational complexity indicator CCIdc syntax element for a current picture may be signaled in a bitstream. The CCIdc equal to a first value may specify that no NN model for in-loop filtering is to be used in the decoding process for the current picture and the CCIdc equal to a second value may specify that NIF1 may be used in the decoding process for the current picture.

The CCIdc equal to a third value may specify that one or more of NIF1 and NIF2 may be used in the decoding process for the current picture, and the CCIdc equal to a fourth value may specify that one or more of NIF1, NIF2, and NIF3 may be used in the decoding process for the current picture.

Instead of using the CCIdc syntax element, some embodiments of this disclosure provide a different way of specifying which NN models are allowed or disallowed for decoding a current picture.

In the above described exemplary scenario, three NN models are provided for in-loop filtering (and/or intra prediction (NIP), motion compensation (NMC)) and the three NN models for in-loop filtering—NIF1, NIF2, and NIF3—have different degrees of trade-offs between the computational complexity and the compression efficiency. For example, the computational complexity of NIF1 is the largest, followed by the computational complexity of NIF2, and the computational complexity of NF3 is the smallest among the three.

In some embodiments, a 2-bit syntax element "ph_nn_in-loop_model_idc" may be defined in a picture header and may specify which NN model for loop-filtering is allowed for coding (e.g., decoding) the current picture, where the value 0 of "ph_nn_inloop_model_idc" specifies that no NN model for in-loop filtering is used (as shown in Table 1 provided below).

In some embodiments, instead of a 2-bit syntax element, other types of syntax elements can be used, such as a fixed length code of any particular length or a variable length codeword (VLC), also known as Huffman code. Also, even though, in some embodiments, the location of the syntax element specifying which NN model for loop-filtering is allowed for the current picture is in the picture header, in other embodiments, other locations for the syntax element such as any parameter set (e.g., sequence parameter set, picture parameter set, adaptation parameter set), or slice header can alternatively be used.

In other embodiments, the usage of NN models may be restricted based on levels. Level may here be understood as level defined in HEVC and VVC. A level-based restriction may be defined as follows for specifying which of the NN models for in-loop filtering may be used for each level. For example, for levels lower than 5.0, any of the three NN models for in-loop filtering, NIF, (i.e., NIF1, NIF2, and NIF3) may be used for coding, and for levels lower than 6.0 (but higher than or equal to 5.0), any of the two less complex NIF (i.e., NIF2 and NIF3) may be used for coding (but not the most complex NIF (NIF1)). For levels lower than 7.0 (but higher than or equal to 6.0), the least complex NIF (i.e., NIF3) may be used for coding, and for levels equal to higher than 7.0, no NIF may be used.

As discussed above, in the embodiments described above, the usage of NN models for decoding a bitstream may be restricted based on the level the bitstream has. For example, if a bitstream to be decoded has a first level, then a particular NN model may be used for decoding the bitstream while if the bitstream has a level higher than the first level, the particular NN model may not be used for decoding. These embodiments allow configuring a decoder such that if the decoder is configured to decode a bitstream having a level higher than the first level, there is no need to configure the decoder to support the usage of the particular NN model for decoding the bitstream.

In another embodiment, the usage of NN models may be restricted based on tiers. Tier may here be understood as tier defined in HEVC and VVC. In this embodiment, the usage of NN models is restricted based on tiers such that if a bitstream to be decoded is associated with a first tier, then a particular NN model may be used for decoding the bitstream while if the bitstream is associated with a tier higher than the first tier, the particular NN model may not be used for decoding. This method may be combined with levels. For example, a decoder conforming to a certain tier and a certain level would be capable of decoding all bitstreams that are associated to the same tier or a lower tier of the same level or any level below it. In this case, if a bitstream to be decoded is associated with a first level and a first tier, a particular NN model may be used for decoding the bitstream while if the bitstream is associated with the same first level and a second tier, where the second tier is lower than the first tier, the particular NN model may not be used for decoding. Alternatively, it is the other way around, such that if the bitstream is associated with the first level and the second tier, where the second tier is higher than the first tier, the particular NN model may not be used for decoding.

An example of the use of tiers is as follows: Some very capable decoders may be able to decode not only low-resolution bit streams using a NN but also higher resolution ones. Thus, it is possible to specify a higher level, say A6.2, that is the same as level 6.2, with the only difference being that A6.2 allows NN decoding while 6.2 does not. Here, the letter in front of the level can signify the tier: No letter in front of the level indicates the lowest NN capability, and a letter A in front of the layer denotes a higher NN capability, and a letter B in front denotes an even higher NN capability, and so on. As an example, the rows in Table 1 starting with A6.2 and B6.2 have the same capability as level 6.2, with the only difference that they allow the use of NN processing for decoding. An alternative would be to just change the level. As an example, the level 8.2 could be the same as 6.2 with the only difference being that 8.2 allows NN decoding while 6.2 does not. The row starting with 8.2 in Table 1 is an example of this. However, as a convention, a level with a certain number should always be able to decode a level with a lower number. Level 8.2 in Table 1 breaks this convention since it can only handle a picture size of 35 651 584 as opposed to 142 606 336 of level 7.0. Therefore, it may be preferable to use tiers and specify the tier using letters such as in the case of A6.2 etc. This letter in front of the level (' ', 'A', 'B', etc) can also be seen as another dimension in which capabilities are increased (or decreased) with respect to NN processing.

In other embodiments, an "sps_nn_intra_prediction_enabled_flag" syntax element may be defined for specifying whether NN model(s) for Intra Prediction (NIP) is enabled or disabled for the Coded Layer Video Sequence (CLVS) (see Table 1 provided below). The usage of NIP may be disallowed for levels equal to or higher than level 6.0 (see Table 1 provided below). NN model(s) for Motion Compensation (NMC) may be allowed for all picture sizes.

Table 1 provided below shows additions to a hypothetical decoder specification which is similar to Versatile Video Coding (VVC). The bolded texts are the parts added according to some embodiments of this disclosure.

Tables 2 and 3 provided below show added syntax elements "ph_nn_inloop_model_idc" and "sps_nn_intra_prediction_enabled_flag" followed by their semantics on top of a hypothetical codec syntax and semantics similar to VVC. The bolded text are the parts added according to some embodiments of this disclosure.

TABLE 2

| | Descriptor |
|---|---|
| seq_parameter_set_rbsp( ) { | |
| ... | |
| sps_film_grain_enable_flag | u(1) |
| sps_nn_intra_prediction_enabled_flag | u(1) |
| ... | |

The "sps_nn_intra_prediction_enabled_flag" equal to 1 may specify that one or more neural network related syntax elements could be present in the coding unit syntax of the CLVS. The "sps_nn_intra_prediction_enabled_flag" equal to 0 may specify that neural network intra prediction modes

TABLE 1

| Level nickname | Format | general_level_idc value* | Max luma picture size MaxLumaPs (samples) | Max CPB size MaxCPB (CpbVclFactor or CpbNalFactor bits) Main tier | High tier | Max slices per AU MaxSlicesPerAu |
|---|---|---|---|---|---|---|
| 1.0 | QCIF | 16 | 36 864 | 350 | — | 16 |
| 2.0 | CIF | 32 | 122 880 | 1 500 | — | 16 |
| 2.1 | Q720p | 35 | 245 760 | 3 000 | — | 20 |
| 3.0 | 480p | 48 | 552 960 | 6 000 | — | 30 |
| 3.1 | 720p30 | 51 | 983 040 | 10 000 | — | 40 |
| 4.0 | 720p60 | 64 | 2 228 224 | 12 000 | 30 000 | 75 |
| 4.1 | 1080p60 | 67 | 2 228 224 | 20 000 | 50 000 | 75 |
| 5.0 | 4Kp30 | 80 | 8 912 896 | 25 000 | 100 000 | 200 |
| 5.1 | 4Kp60 | 83 | 8 912 896 | 40 000 | 160 000 | 200 |
| 5.2 | 4Kp120 | 86 | 8 912 896 | 60 000 | 240 000 | 200 |
| 6.0 | 8Kp30 | 96 | 35 651 584 | 80 000 | 240 000 | 600 |
| 6.1 | 8Kp60 | 99 | 35 651 584 | 120 000 | 480 000 | 600 |
| 6.2 | 8Kp120 | 102 | 35 651 584 | 180 000 | 800 000 | 600 |
| 7.0 | 16Kp30 | 105 | 142 606 336 | 240 000 | 1 200 000 | 600 |
| 7.1 | 16Kp60 | 108 | 142 606 336 | 360 000 | 1 800 000 | 600 |
| 7.2 | 16Kp120 | 111 | 142 606 336 | 480 000 | 2 600 000 | 600 |
| 8.2 | 8Kp120 | 102 | 35 651 584 | 180 000 | 800 000 | 600 |
| A6.2 | 8Kp120 | 102 | 35 651 584 | 180 000 | 800 000 | 600 |
| B6.2 | 8Kp120 | 102 | 35 651 584 | 180 000 | 800 000 | 600 |

| Level | Max # of tiles MaxTilesPerAu | Max # of tile columns MaxTileCols | Max value of ph_nn_inloop_model_idc | Max value of sps_nn_intra_prediction_enabled_flag |
|---|---|---|---|---|
| 1.0 | 1 | 1 | 3 | 1 |
| 2.0 | 1 | 1 | 3 | 1 |
| 2.1 | 1 | 1 | 3 | 1 |
| 3.0 | 4 | 2 | 3 | 1 |
| 3.1 | 9 | 3 | 3 | 1 |
| 4.0 | 25 | 5 | 3 | 1 |
| 4.1 | 25 | 5 | 3 | 1 |
| 5.0 | 110 | 10 | 2 | 1 |
| 5.1 | 110 | 10 | 2 | 1 |
| 5.2 | 110 | 10 | 2 | 1 |
| 6.0 | 440 | 20 | 1 | 0 |
| 6.1 | 440 | 20 | 1 | 0 |
| 6.2 | 440 | 20 | 1 | 0 |
| 7.0 | 440 | 40 | 0 | 0 |
| 7.1 | 440 | 40 | 0 | 0 |
| 7.2 | 440 | 40 | 0 | 0 |
| 8.2 | 440 | 20 | 2 | 1 |
| A6.2 | 440 | 20 | 2 | 1 |
| B6.2 | 440 | 20 | 3 | 1 | are disabled and that the one or more neural network related syntax elements is not present in the coding unit syntax of the CLVS.

TABLE 3

| | Descriptor |
|---|---|
| picture_header_structure( ) { | |
| ... | |
| if( pps_output_flag_present_flag && | |
| !ph_non_ref pic_flag ) | |
| ph_pic_output_flag | u(1) |
| ph_nn_inloop_model_idc | u(2) |
| ... | |

According to some embodiments, the "ph_nn_in-loop_model_idc" equal to 0 may specify that no NN in-loop filtering is performed for the current picture and that "nn_on_off_flag" is not present in the coding unit syntax of the current picture.

The "ph_nn_inloop_model_idc" equal to 1 may specify that the picture may use NN in-loop filter model C in the decoding process for the current picture and the "ph_nn_in-loop_model_idc" equal to 2 may specify that the picture may use NN in-loop filter model B in the decoding process for the current picture.

The "ph_nn_inloop_model_idc" equal to 3 may specify that the picture may use NN in-loop filter model A in the decoding process for the current picture.

In some embodiments, only one NIF per level is allowed depending on a given level such that for a particular level (e.g., level 4.1), the one with highest complexity is used and, for another particular level (e.g., level 5.0) the one with medium complexity is used. Then a decoder for level 4.1 and below doesn't need to implement more than one filter. This may be good if switching filter per picture is problematic in practice.

According to some embodiments of this disclosure, a decoder decoding a current picture in a coded video bit-stream may perform all or a subset of the following steps:
   (1) Decoding a first computational complexity indicator value for the coded video bitstream.
   (2) Determining that a first coding tool is allowed to be used for decoding the current picture based on the first computational complexity indicator value. The first coding tool may be allowed to be used if the first computational complexity indicator value compared to a first threshold value is true while the first coding tool may not be allowed to be used if the first computational complexity indicator value compared to the first thresh-old value is false.
   (3) Decoding the current picture into a decoded current picture using the first coding tool during the decoding.
   (4) Outputting the decoded current picture.

Alternatively, in other embodiments, a decoder decoding a current picture in a coded video bitstream may perform all or a subset of the following steps:
   (1) Decoding a first computational complexity indicator value for the coded video bitstream.
   (2) Determining that a first coding tool is allowed to be used for decoding the current picture based on the first computational complexity indicator value. The deter-mination may be made according to any one or more of the followings:
   (2-1) The first coding tool may be allowed to be used if the first computational complexity indicator value is equal to or smaller than a first threshold value while the first coding tool is not allowed to be used if the first computational complexity indicator value is larger than the first threshold value.
   (2-2) The first coding tool may be allowed to be used if the first computational complexity indicator value is equal to or larger than a first threshold value while the first coding tool may not be allowed to be used if the first computational complexity indicator value is smaller than the first threshold value.
   (2-3) The first coding tool may be allowed to be used if the first computational complexity indicator value is within a range of values defined using a first threshold value while the first coding tool may not be allowed to be used if the first computational complexity indicator value is outside the range of values defined using the first threshold value.
   (2-4) The first coding tool may be allowed to be used if the first computational complexity indicator value is within a range of values defined using a first threshold value T1 and a second threshold value T2 where T1<T2 while the first coding tool may not be allowed to be used if the first computational complexity indicator value is outside the range of values defined using the first threshold value and the second threshold value.
   (2-5) The first coding tool may be allowed to be used if the first computational complexity indicator value is outside a range of values defined using a first threshold value T1 and a second threshold value T2, where T1<T2 while the first coding tool may not be allowed to be used if the first computational complexity indi-cator value is within the range of values defined using the first threshold value and the second threshold value.
   (3) Decoding the current picture into a decoded current picture using the first coding tool during the decoding.
   (4) Outputting the decoded current picture.

In some embodiments, the first threshold value may be equal to a maximum allowed value. In other embodiments, the first threshold value may be equal to 0. Similarly, in some embodiments, the second threshold value may be equal to a maximum value. In some embodiments, the first coding tool is a neural network model or comprises a neural network model.

As discussed above, in some embodiments, the compu-tational complexity indicator may be a video codec level indicator or a video codec tier indicator. The video codec level or tier indicator may specify a set of restrictions on a coded video bitstream.

In one example, the specified set of restrictions may indicate whether a particular coding tool may be used or may not be used for decoding the coded video bitstream. In such example, the specified set of restrictions may identify such particular coding tool that is allowed or disallowed to be used for decoding.

In another example, the specified set of restrictions may indicate whether a particular type of coding tools (e.g., any coding tools that use NN models for decoding) may be used or may not be used for decoding the coded video bitstream. In such example, the specified set of restrictions may iden-tify such particular type of coding tool that is allowed or disallowed to be used for decoding.

In some embodiments, the computational complexity indicator is a level indicator that indicates a level to which an output layer set (OLS) (that is in scope when decoding the coded video bitstream) conforms.

According to some embodiments, a computational com-plexity indicator may be any combination of one or more of the followings: (1) a video codec level indicator or a video codec tier indicator, indicating a set of one or more restrictions on the coded video bitstream; (2) a resolution; (3) a picture size; (4) a sample rate (e.g., in time unit); (5) a frame rate (a.k.a., "a picture rate") (e.g., in time unit); (6) a processing capability indicator indicating a processing capability required for decoding at least a portion of the coded video bitstream; (7) a memory size indicating a size of a memory required for decoding at least a portion of the coded video bitstream.

As discussed above, in some embodiments, whether a coding tool is indicated to be allowed or disallowed for decoding a coded bitstream may be determined based on a comparison of a computational complexity indicator value and one or more threshold values.

In some embodiments, the one or more threshold values may be set such that only a particular combination of coding tools is indicated to be allowed or disallowed for decoding.

For example, the relation of the computational complexity indicator value to the threshold value(s) may be defined in a way that if coding tool T1 is allowed for decoding for value V1 of the computational complexity indicator, then the coding tool T2 is not allowed for decoding, and if the coding tool T2 is allowed for decoding for value V1 of the computational complexity indicator, then the coding tool T1 is not allowed for decoding.

In another example, the relation of the computational complexity indicator value to the threshold value(s) may be defined in a way that the coding tools T1 and T2 cannot be allowed at the same time if the computational complexity indicator has value V1 but both T1 and T2 can be disallowed at the same time.

Table 4 below provides examples showing how the coding tools T1 and T2 can be indicated to be allowed or disallowed for decoding based on the relation of the computational complexity indicator value to the threshold value(s).

TABLE 4

| Condition on the relation of the computational complexity indicator value to the threshold value(s) is evaluated as: | T1/T2 |
| --- | --- |
| 1 | satisfied | allowed/disallowed OR disallowed/allowed |
| | unsatisfied | allowed/allowed OR disallowed/disallowed |
| 2 | satisfied | allowed/disallowed OR disallowed/disallowed |
| | unsatisfied | disallowed/allowed OR allowed/allowed |
| 3 | satisfied | allowed/disallowed OR allowed/allowed |
| | unsatisfied | disallowed/allowed OR disallowed/disallowed |
| 4 | satisfied | allowed/allowed OR disallowed/disallowed |
| | unsatisfied | allowed/disallowed OR disallowed/allowed |
| 5 | satisfied | disallowed/allowed OR allowed/allowed |
| | unsatisfied | allowed/disallowed OR disallowed/disallowed |
| 6 | satisfied | disallowed/allowed OR disallowed/disallowed |
| | unsatisfied | allowed/disallowed OR allowed/allowed |
| 7 | satisfied | disallowed/disallowed OR disallowed/allowed OR allowed/allowed |
| | unsatisfied | allowed/disallowed |
| 8 | satisfied | allowed/disallowed OR disallowed/allowed OR allowed/allowed |
| | unsatisfied | disallowed/disallowed |
| 9 | satisfied | allowed/disallowed OR disallowed/allowed OR disallowed/disallowed |
| | unsatisfied | allowed/allowed |

TABLE 4-continued

| Condition on the relation of the computational complexity indicator value to the threshold value(s) is evaluated as: | T1/T2 |
| --- | --- |
| 10 | satisfied | allowed/disallowed |
| | unsatisfied | disallowed/disallowed OR disallowed/allowed OR allowed/allowed |
| 11 | satisfied | disallowed/disallowed |
| | unsatisfied | allowed/disallowed OR disallowed/allowed OR allowed/allowed |
| 12 | satisfied | allowed/allowed |
| | unsatisfied | allowed/disallowed OR disallowed/allowed OR disallowed/disallowed |

As shown above, Table 4 provides a list of conditions and indications of whether T1 and/or T2 are allowed or disallowed based on the satisfaction of the conditions. For example, according to Table 4 provided above, in case condition 1 is satisfied, there are two scenarios. The first scenario is allowing T1 while disallowing T2 and the second scenario is disallowing T1 while allowing T2. In other words, only one of T1 and T2 is allowed in case condition 1 is satisfied. In case condition 1 is unsatisfied, there are two other scenarios. The first scenario is allowing both T1 and T2 and the second scenario is disallowing both T1 and T2.

In some embodiments, an additional indicator (or any other means) such as a second computational complexity indicator or another indicator may be used to indicate whether the coding tool T2 is allowed or disallowed to be used for decoding. In these embodiments, the coding tool T1 may be indicated to be allowed or disallowed based on two inputs: (1) the relation of the first computational complexity indicator value to the threshold value(s) and (2) whether the coding tool T2 is allowed or disallowed.

As discussed above, in some embodiments, the computational complexity indicator corresponds to the traditional video codec level (a.k.a., "base level L"). However, in other embodiments, the computational complexity indicator indicates another aspect of complexity specified for an additional level N such that the combination of PTLN describes a profile, tier, base level, and the additional level a video bitstream or a decoder conforms to.

In some embodiments, another aspect of complexity specified for the additional level N may be NN-based computational complexity. A decoder may have different capabilities or resources for decoding a video bitstream using traditional coding tools and NN-based coding tools.

NN-based decoding processes typically use certain dedicated hardware (e.g., specific NN chip sets and possibly its own dedicated memory) to process data. Thus, different decoders may have varying NN-based decoding capabilities or resources despite having equivalent traditional decoding capabilities. Also, a decoder which is very capable of decoding a traditional video bitstream (i.e., the video bitstream generated using traditional coding tools) may not have the support for decoding a video bitstream using NN-based coding tools. Therefore, an overall profile or level definition may not be sufficient to specify the NN-based decoding complexity required by the decoder for decoding a video bitstream that is generated using NN-based coding tools.

Accordingly, in some embodiments of this disclosure, two indicators—a base level indicator and a computational complexity indicator—are provided. The base level indicator may specify the base level L with a first set of restrictions on a coded video bitstream and the computational complexity indicator may specify the additional level N with a second set of restrictions on the coded video bitstream.

The second set of restrictions may specify whether a specific coding tool is allowed to be used or not for the coded video bitstream. For a coded video bitstream to be decodable at a certain base level L and at a certain additional level N, the bitstream and/or the Output Layer Set (OLS) in scope would have to conform to both the level L and the additional level N.

Likewise, a decoder conforming to the base level L and the additional level N may be capable of decoding a coded video bitstream conforming to the base level L and the additional level N.

In one example, the conformance of a decoder to a particular profile, a particular base level, and/or a particular additional level may be specified as follows: Decoders conforming to profile P2 at a specific level L of a specific tier T and at a specific additional level N may be capable of decoding all bitstreams for which all of the following conditions apply: (1) the bitstream is indicated to conform to the profile P2 or profile P1; (2) the bitstream is indicated to conform to a tier that is lower than or equal to the specified tier T; (3) the bitstream is indicated to conform to a level L that is lower than or equal to the specified level L; and (4) the bitstream is indicated to conform to an additional level N that is lower or equal to the specified additional level N.

As discussed above, in some embodiments, the computational complexity indicator may be signaled in a video bitstream. For example, the computational complexity indicator may be signaled in a parameter set or a header in the bitstream, such as a video parameter set (VPS), a sequence parameter set (SPS), a picture parameter set (PPS), a picture header (PH), or a slice header (SH). The computational complexity indicator may also be signaled in a Decoding Capability Information (DCI) or an equivalent decoder session level unit.

In some embodiments, the computational complexity indicator may be signaled in a PTL structure in the bitstream. The PTL structure may be signaled in a parameter set such as VPS and SPS, and/or in DCI. In other embodiments, the computational complexity indicator is signaled in Video Usability Information (VUI) as part of SPS.

In some embodiments, the computational complexity indicator may be signaled in a General Constraints Information (GCI) structure or an equivalent structure. The GCI may, for instance, be signaled in DCI, VPS, or SPS. The computational complexity indicator may be provided as a constraint (e.g., as a maximum allowed value) or as a flag where a first value of the flag (e.g., 1) specifies that the bitstream does not contain any pictures that uses a coding tool T for the decoding while a second value of the flag (e.g., 0) does not impose such constraint.

In different embodiments, the computational complexity indicator may be signaled in a Supplemental Enhancement Information (SEI) message. The computational complexity indicator in the SEI message may be valid for the entire session. Additionally or alternatively, the computational complexity indicator may be updated by sending an additional SEI message.

Additionally or alternatively, the computational complexity indicator may be signaled using external means (e.g., via metadata possibly provided in a different data channel than the video bitstream, as a constant in the decoder, or provided through an Application Program Interface (API)) to the decoder.

Additionally or alternatively, the computational complexity indicator may be signaled at the systems layer. In some embodiments, the computational complexity indicator is signaled using any one or more of the followings: Real-Time Streaming Protocol (RTSP), Dynamic Adaptive Streaming over HTTP (DASH), MPEG-DASH, HTTP Live Streaming (HLS), ISO Base Media File Format (ISOBMFF), Common Media Application Format (CMAF), Session Description Protocol (SDP), Real-time Transport Protocol (RTP), Session Initiation Protocol (SIP), Web Real-Time Communication (WebRTC), and Secure Media Frames (SFRAME).

FIG. 2 shows a process 200 for decoding a picture included in a coded video bitstream, according to some embodiments. Process 200 may begin with step s202. Step s202 comprises obtaining a computational complexity indicator associated with the coded video bitstream. Step s204 comprises using the obtained computational complexity indicator, determining whether one or more coding tools is allowed to be used for decoding the picture. Step s206 comprises based at least on the determination, decoding the picture. Step s208 comprises outputting the decoded picture.

In some embodiments, determining whether one or more coding tools is allowed to be used for decoding the picture comprises determining any one of a plurality of conditions is satisfied based on the obtained computational complexity indicator, each of the plurality of conditions is associated with each of the coding tools, based on determining that a condition included in the plurality of conditions is satisfied, selecting a coding tool associated with the satisfied condition, and the decoding is performed using the selected tool.

In some embodiments, the computational complexity indicator corresponds to any one or more of the following: (i) a video codec level indicator or a video codec tier indicator, indicating a set of one or more restrictions on the coded video bitstream; (ii) a resolution; (iii) a picture size; (iv) a sample rate; (v) a frame rate; (vi) a processing capability indicator indicating a processing capability required for decoding at least a portion of the coded video bitstream; or (vii) a memory size indicating a size of a memory required for decoding at least a portion of the coded video bitstream.

In some embodiments, the video codec level indicator indicates a level to which an output layer set that is in scope when decoding at least a portion of the coded video bitstream conforms.

In some embodiments, at least one of said one or more coding tools is a neural network, NN, model or at least one of said one or more coding tools comprises an NN model.

In some embodiments, the NN model is for in-loop filtering, intra-prediction, or motion compensation.

In some embodiments, said one or more coding tools comprises a first decoding tool, the computational complexity indicator has a first value, the method further comprises comparing the first value of the computational complexity indicator to a threshold value, and the decoding the picture comprises decoding the picture using the first decoding tool based on the comparison.

In some embodiments, said one or more coding tools comprises a first decoding tool and a second decoding tool, the first decoding tool has a first computational complexity, the second decoding tool has a second computational complexity, the first computational complexity is lower than the second computational complexity, determining whether one or more coding tools is allowed to be used for decoding comprises selecting one of the first decoding tool and the second decoding tool for decoding the picture based on the first computational complexity and/or the second computational complexity.

In some embodiments, in case the computational complexity indicator satisfies a first condition, the method comprises determining that none of the first decoding tool and the second decoding tool can be used for decoding the picture.

In some embodiments, in case the computational complexity indicator satisfies a second condition, the method comprises determining that one of the first decoding tool and the second decoding tool can be used for decoding the picture.

In some embodiments, in case the computational complexity indicator satisfies a third condition, the method comprises determining that any one or more of the first decoding tool and the second decoding tool can be used for decoding the picture.

In some embodiments, the first, second, and/or third conditions are related to a relation between (i) the computational complexity indicator and (ii) one or more threshold values.

In some embodiments, the first condition is that a value of the computational complexity indicator is less than a first threshold value, the second condition is that the value of the computational complexity indicator is greater than or equal to the first threshold value but less than a second threshold value, and the third condition is that the value of the computational complexity indicator is greater than or equal to the second threshold value.

In some embodiments, the method further comprises: obtaining a video codec level indicator indicating a set of one or more restrictions on the coded video bitstream, wherein the computational complexity indicator is different from the video codec level indicator.

In some embodiments, the video codec level indicator indicates a base level and the computational complexity indicator indicates an additional level, and the base level and the additional levels are levels to which an output layer set that is in scope when decoding the coded video bitstream conforms.

In some embodiments, obtaining the computational complexity indicator comprises receiving the bitstream, and the computational complexity indicator is included in any one or more of the followings: (i) a Profile, Tier, Level, PTL, structure in the bitstream, (ii) General Constraints Information, GCI, structure in the bitstream, (iii) a Supplemental Enhancement Information, SEI, message, (iv) a Picture Parameter Set, PPS, (v) a Picture Header, PH, (vi) a Slice Header, SH, or (vii) a Video Usability Information, VUI.

In some embodiments, the PTL structure or the GCI structure is included in any one of the followings: a Video Parameter Set, VPS, a Sequence Parameter Set, SPS, or Decoding Capability Information, DCI.

In some embodiments, the computational complexity indicator is signaled using at least one of: (i) Real-Time Streaming Protocol, RTSP; (ii) Dynamic Adaptive Streaming DASH; (iii) Motion Picture Experts Group-DASH, MPEG-DASH; (iv) Hypertext Transfer Protocol, HTTP, Living Streaming, HLS; (v) International Standard Organization, ISO, Base Media File Format, ISOBMFF; (vi) Common Media Application Format, CMAF; (vii) Session Description Protocol, SDP; (viii) Real-Time Transport Protocol, RTP; (ix) Session Initiation Protocol, SIP; (x) Web Real-Time Communication, WebRTC; and/or (xi) Secure Frame, SFRAME.

Figure 3:
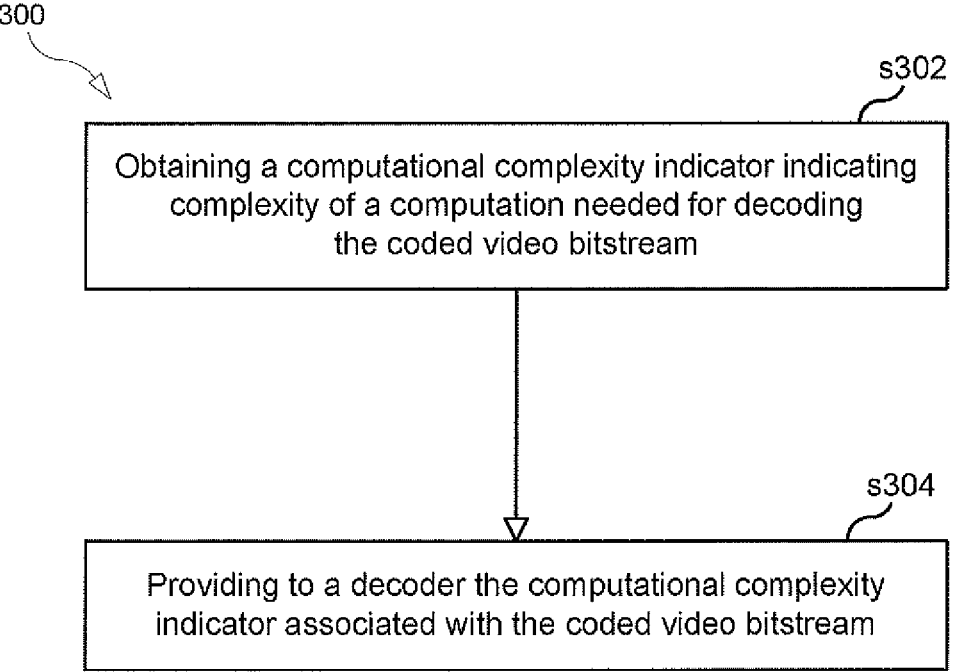
FIG. 3 shows a process according to some embodiments.

FIG. 3 shows a process 300 for decoding a picture included in a coded video bitstream, according to some embodiments. Process 300 may begin with step s302. Step s302 comprises obtaining a computational complexity indicator indicating complexity of a computation needed for decoding the coded video bitstream. Step s304 comprises providing to a decoder the computational complexity indicator associated with the coded video bitstream. The obtained computational complexity indicator is configured to be used for determining whether one or more coding tools is allowed to be used for decoding the picture.

In some embodiments, determining whether one or more coding tools is allowed to be used for decoding the picture comprises determining if any one of a plurality of conditions is satisfied based on the obtained computational complexity indicator, each of the plurality of conditions is associated with each of the coding tools, and based on determining that a condition included in the plurality of conditions is satisfied, selecting a coding tool associated with the satisfied condition for decoding the picture.

In some embodiments, the computational complexity indicator corresponds to any one or more of the following: (i) a video codec level indicator or a video codec tier indicator, indicating a set of one or more restrictions on the coded video bitstream; (ii) a resolution; (iii) a picture size; (iv) a sample rate; (v) a frame rate; (vi) a processing capability indicator indicating a processing capability required for decoding at least a portion of the coded video bitstream; or (vii) a memory size indicating a size of a memory required for decoding at least a portion of the coded video bitstream.

In some embodiments, the video codec level indicator indicates a level to which an output layer set that is in scope when decoding at least a portion of the coded video bitstream conforms.

In some embodiments, at least one of said one or more coding tools is a neural network, NN, model or at least one of said one or more coding tools comprises an NN model.

In some embodiments, the NN model is for in-loop filtering, intra-prediction, or motion compensation.

In some embodiments, said one or more coding tools comprises a first decoding tool, the computational complexity indicator has a first value, and the decoder is configured to compare the first value of the computational complexity indicator to a threshold value, and the decoder is further configured to decode the picture using the first decoding tool based on the comparison.

In some embodiments, said one or more coding tools comprises a first decoding tool and a second decoding tool, the first decoding tool has a first computational complexity, the second decoding tool has a second computational complexity, the first computational complexity is lower than the second computational complexity, and determining whether one or more coding tools is allowed to be used for decoding comprises selecting one of the first decoding tool and the second decoding tool for decoding the picture based on the first computational complexity and/or the second computational complexity.

In some embodiments, in case the computational complexity indicator satisfies a first condition, determining whether one or more coding tools is allowed to be used for decoding comprises determining that none of the first decoding tool and the second decoding tool can be used for decoding the picture.

In some embodiments, in case the computational complexity indicator satisfies a second condition, determining whether one or more coding tools is allowed to be used for decoding comprises determining that one of the first decoding tool and the second decoding tool can be used for decoding the picture.

In some embodiments, in case the computational complexity indicator satisfies a third condition, determining whether one or more coding tools is allowed to be used for decoding comprises determining that any one or more of the first decoding tool and the second decoding tool can be used for decoding the picture.

In some embodiments, the first, second, and/or third conditions are related to a relation between (i) the computational complexity indicator and (ii) one or more threshold values.

In some embodiments, the first condition is that a value of the computational complexity indicator is less than a first threshold value, the second condition is that the value of the computational complexity indicator is greater than or equal to the first threshold value but less than a second threshold value, and the third condition is that the value of the computational complexity indicator is greater than or equal to the second threshold value.

In some embodiments, the computational complexity indicator is different from a video codec level indicator indicating a set of one or more restrictions on the coded video bitstream.

In some embodiments, the video codec level indicator indicates a base level and the computational complexity indicator indicates an additional level, and the base level and the additional levels are levels to which an output layer set that is in scope when decoding the coded video bitstream conforms.

In some embodiments, providing the computational complexity indicator comprises transmitting the bitstream, and the computational complexity indicator is included in any one or more of the followings: (i) a Profile, Tier, Level, PTL, structure in the bitstream, (ii) General Constraints Information, GCI, structure in the bitstream, (iii) a Supplemental Enhancement Information, SEI, message, (iv) a Picture Parameter Set, PPS, (v) a Picture Header, PH, (vi) a Slice Header, SH, or (vii) a Video Usability Information, VUI.

In some embodiments, the PTL structure or the GCI structure is included in any one of the followings: a Video Parameter Set, VPS, a Sequence Parameter Set, SPS, or Decoding Capability Information, DCI.

In some embodiments, the computational complexity indicator is signaled using at least one of: (i) Real-Time Streaming Protocol, RTSP; (ii) Dynamic Adaptive Streaming DASH; (iii) Motion Picture Experts Group-DASH, MPEG-DASH; (iv) Hypertext Transfer Protocol, HTTP, Living Streaming, HLS; (v) International Standard Organization, ISO, Base Media File Format, ISOBMFF; (vi) Common Media Application Format, CMAF; (vii) Session Description Protocol, SDP; (viii) Real-Time Transport Protocol, RTP; (ix) Session Initiation Protocol, SIP; (x) Web Real-Time Communication, WebRTC; and/or (xi) Secure Frame, SFRAME.

Figure 4:
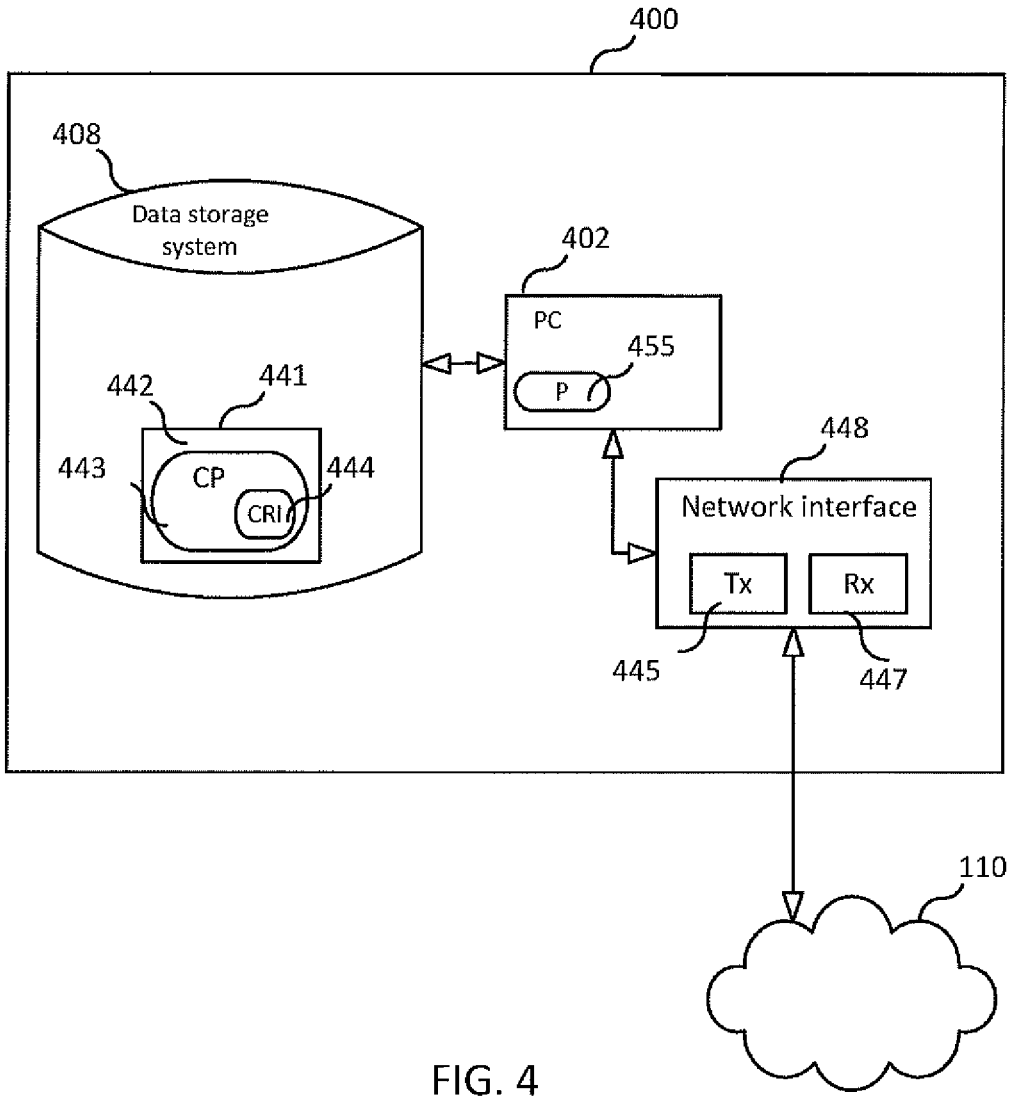
FIG. 4 shows a structure of an encoder and/or a decoder according to some embodiments.
Figure 5:
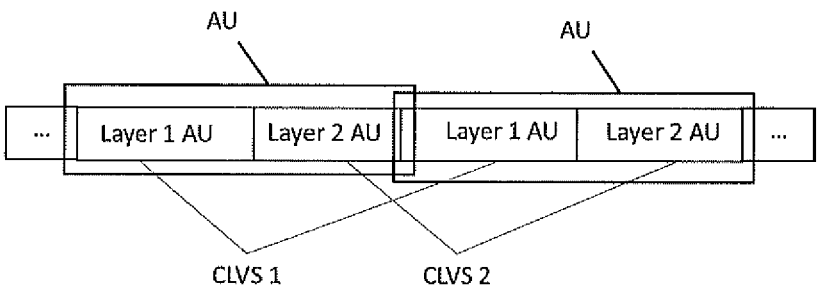
FIG. 5 shows a relation between layer access units and coded layer video sequences.
Figure 6:
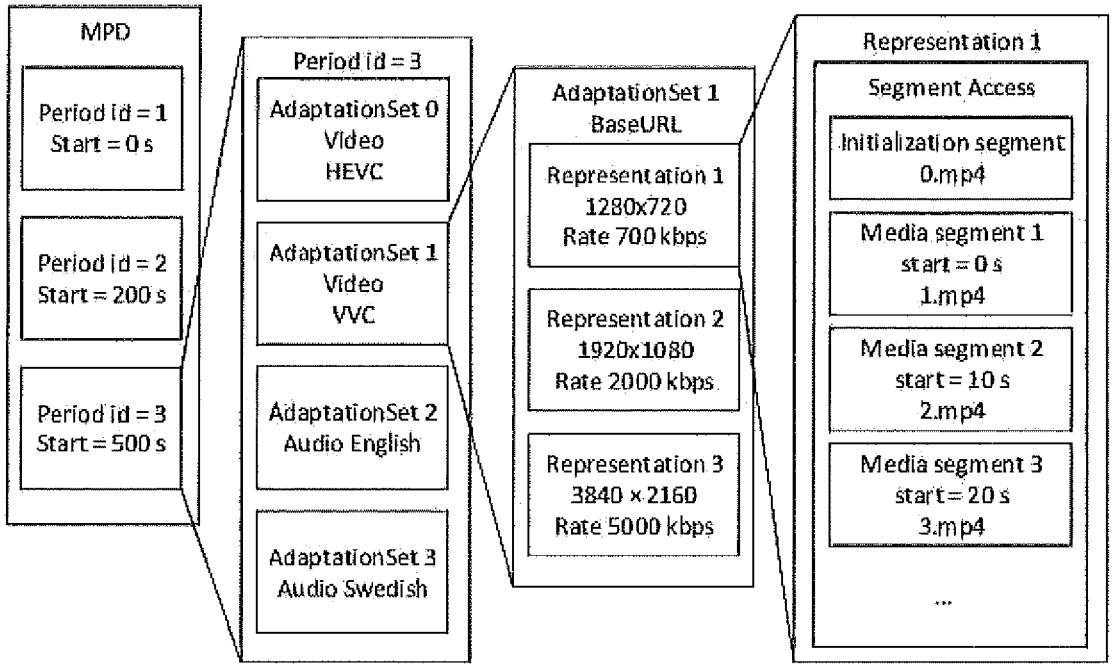
FIG. 6 shows an example of MPD.
Figure 7:
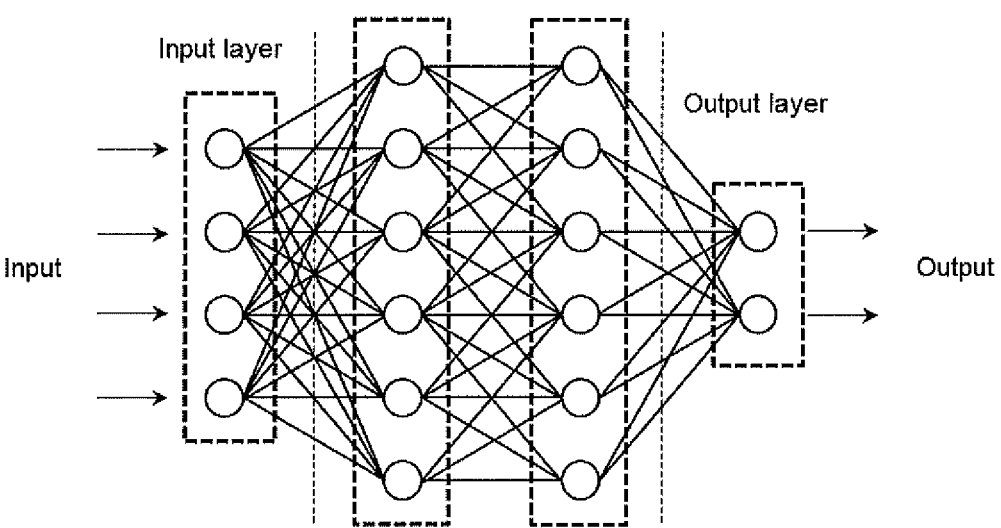
FIG. 7 shows an example of a neural network.

FIG. 4 is a block diagram of an apparatus 400 for implementing the encoder and/or the decoder, according to some embodiments. When apparatus 400 implements a decoder, apparatus 400 may be referred to as a "decoding apparatus 400," and when apparatus 400 implements an encoder, apparatus 400 may be referred to as an "encoding apparatus 900." As shown in FIG. 4, apparatus 400 may comprise: processing circuitry (PC) 402, which may include one or more processors (P) 455 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 400 may be a distributed computing apparatus); at least one network interface 448 comprising a transmitter (Tx) 445 and a receiver (Rx) 447 for enabling apparatus 400 to transmit data to and receive data from other nodes connected to a network 110 (e.g., an Internet Protocol (IP) network) to which network interface 448 is connected (directly or indirectly) (e.g., network interface 448 may be wirelessly connected to the network 110, in which case network interface 448 is connected to an antenna arrangement); and a storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes apparatus 400 to perform steps described herein (e.g., steps described herein with reference to the flow charts). In other embodiments, apparatus 400 may be configured to perform steps described herein without the need for code. That is, for example, PC 402 may consist merely of one or more ASICs. Hence, the features of the embodiments described herein may be implemented in hardware and/or software.

Summary of Embodiments

A1. A method (200) for decoding a picture included in a coded video bitstream, the method comprises:

obtaining (s202) a computational complexity indicator associated with the coded video bitstream;

using the obtained computational complexity indicator, determining (s204) whether one or more coding tools is allowed to be used for decoding the picture;

based at least on the determination, decoding (s206) the picture; and outputting (s208) the decoded picture.

A2. The method of embodiment A1, wherein determining whether one or more coding tools is allowed to be used for decoding the picture comprises determining any one of a plurality of conditions is satisfied based on the obtained computational complexity indicator, each of the plurality of conditions is associated with each of the coding tools, based on determining that a condition included in the plurality of conditions is satisfied, selecting a coding tool associated with the satisfied condition, and the decoding is performed using the selected tool.

A3. The method of embodiment A1 or A2, wherein the computational complexity indicator corresponds to any one or more of the following:

(i) a video codec level indicator or a video codec tier indicator, indicating a set of one or more restrictions on the coded video bitstream;

(ii) a resolution;

(iii) a picture size;

(iv) a sample rate;

(v) a frame rate;

(vi) a processing capability indicator indicating a processing capability required for decoding at least a portion of the coded video bitstream; or (vii) a memory size indicating a size of a memory required for decoding at least a portion of the coded video bitstream.

A4. The method of embodiment A3, wherein the video codec level indicator indicates a level to which an output layer set that is in scope when decoding at least a portion of the coded video bitstream conforms.

A5. The method of any one of embodiments A1-A4, wherein at least one of said one or more coding tools is a neural network, NN, model or at least one of said one or more coding tools comprises an NN model.

A6. The method of embodiment A5, wherein the NN model is for in-loop filtering, intra-prediction, or motion compensation.

A7. The method of any one of embodiments A1-A6, wherein said one or more coding tools comprises a first decoding tool, the computational complexity indicator has a first value, the method further comprises comparing the first value of the computational complexity indicator to a threshold value, and the decoding the picture comprises decoding the picture using the first decoding tool based on the comparison.

A8. The method of any one of embodiments A1-A6, wherein said one or more coding tools comprises a first decoding tool and a second decoding tool, the first decoding tool has a first computational complexity, the second decoding tool has a second computational complexity, the first computational complexity is lower than the second computational complexity, determining whether one or more coding tools is allowed to be used for decoding comprises selecting one of the first decoding tool and the second decoding tool for decoding the picture based on the first computational complexity and/or the second computational complexity.

A9. The method of embodiment A8, wherein in case the computational complexity indicator satisfies a first condition, the method comprises determining that none of the first decoding tool and the second decoding tool can be used for decoding the picture.

A10. The method of embodiment A8 or A9, wherein in case the computational complexity indicator satisfies a second condition, the method comprises determining that one of the first decoding tool and the second decoding tool can be used for decoding the picture.

A11. The method of any one of embodiments A8-A10, wherein in case the computational complexity indicator satisfies a third condition, the method comprises determining that any one or more of the first decoding tool and the second decoding tool can be used for decoding the picture.

A12. The method of embodiment A11, wherein the first, second, and/or third conditions are related to a relation between (i) the computational complexity indicator and (ii) one or more threshold values.

A13. The method of embodiment A12, wherein the first condition is that a value of the computational complexity indicator is less than a first threshold value, the second condition is that the value of the computational complexity indicator is greater than or equal to the first threshold value but less than a second threshold value, and the third condition is that the value of the computational complexity indicator is greater than or equal to the second threshold value.

A14. The method of any one of embodiments A1-A13, the method further comprising:

obtaining a video codec level indicator indicating a set of one or more restrictions on the coded video bitstream, wherein the computational complexity indicator is different from the video codec level indicator.

A15. The method of embodiment A14, wherein the video codec level indicator indicates a base level and the computational complexity indicator indicates an additional level, and the base level and the additional levels are levels to which an output layer set that is in scope when decoding the coded video bitstream conforms.

A16. The method of any one of embodiments A1-A15, wherein obtaining the computational complexity indicator comprises receiving the bitstream, and the computational complexity indicator is included in any one or more of the followings:

(i) a Profile, Tier, Level, PTL, structure in the bitstream, (ii) General Constraints Information, GCI, structure in the bitstream, (iii) a Supplemental Enhancement Information, SEI, message, (iv) a Picture Parameter Set, PPS, (v) a Picture Header, PH, (vi) a Slice Header, SH, or (vii) a Video Usability Information, VUI.

A17. The method of embodiment A16, wherein the PTL structure or the GCI structure is included in any one of the followings: a Video Parameter Set, VPS, a Sequence Parameter Set, SPS, or Decoding Capability Information, DCI.

A18. The method of any one of embodiments A1-A17, wherein the computational complexity indicator is signaled using at least one of:

(i) Real-Time Streaming Protocol, RTSP;

(ii) Dynamic Adaptive Streaming DASH;

(iii) Motion Picture Experts Group-DASH, MPEG-DASH;

(iv) Hypertext Transfer Protocol, HTTP, Living Streaming, HLS;

(v) International Standard Organization, ISO, Base Media File Format, ISOBMFF;

(vi) Common Media Application Format, CMAF;

(vii) Session Description Protocol, SDP;

(viii) Real-Time Transport Protocol, RTP;

(ix) Session Initiation Protocol, SIP;

(x) Web Real-Time Communication, WebRTC; and/or (xi) Secure Frame, SFRAME.

B1. A method (300) for decoding a picture included in a coded video bitstream, the method comprises:

obtaining (s302) a computational complexity indicator indicating complexity of a computation needed for decoding the coded video bitstream; and providing (s304) to a decoder the computational complexity indicator associated with the coded video bitstream, wherein the obtained computational complexity indicator is configured to be used for determining whether one or more coding tools is allowed to be used for decoding the picture.

B2. The method of embodiment B1, wherein determining whether one or more coding tools is allowed to be used for decoding the picture comprises determining any one of a plurality of conditions is satisfied based on the obtained computational complexity indicator, each of the plurality of conditions is associated with each of the coding tools, and based on determining that a condition included in the plurality of conditions is satisfied, selecting a coding tool associated with the satisfied condition for decoding the picture.

B3. The method of embodiment B1 or B2, wherein the computational complexity indicator corresponds to any one or more of the following:

(i) a video codec level indicator or a video codec tier indicator, indicating a set of one or more restrictions on the coded video bitstream;

(ii) a resolution;

(iii) a picture size;

(iv) a sample rate;

(v) a frame rate;

(vi) a processing capability indicator indicating a processing capability required for decoding at least a portion of the coded video bitstream; or (vii) a memory size indicating a size of a memory required for decoding at least a portion of the coded video bitstream.

B4. The method of embodiment B3, wherein the video codec level indicator indicates a level to which an output layer set that is in scope when decoding at least a portion of the coded video bitstream conforms.

B5. The method of any one of embodiments B1-B4, wherein at least one of said one or more coding tools is a neural network, NN, model or at least one of said one or more coding tools comprises an NN model.

B6. The method of embodiment B5, wherein the NN model is for in-loop filtering, intra-prediction, or motion compensation.

B7. The method of any one of embodiments B1-B6, wherein said one or more coding tools comprises a first decoding tool, the computational complexity indicator has a first value, and the decoder is configured to compare the first value of the computational complexity indicator to a threshold value, and the decoder is further configured to decode the picture using the first decoding tool based on the comparison.

B8. The method of any one of embodiments B1-B7, wherein said one or more coding tools comprises a first decoding tool and a second decoding tool, the first decoding tool has a first computational complexity, the second decoding tool has a second computational complexity, the first computational complexity is lower than the second computational complexity, and determining whether one or more coding tools is allowed to be used for decoding comprises selecting one of the first decoding tool and the second decoding tool for decoding the picture based on the first computational complexity and/or the second computational complexity.

B9. The method of embodiment B8, wherein in case the computational complexity indicator satisfies a first condition, determining whether one or more coding tools is allowed to be used for decoding comprises determining that none of the first decoding tool and the second decoding tool can be used for decoding the picture.

B10. The method of embodiment B8 or B9 wherein in case the computational complexity indicator satisfies a second condition, determining whether one or more coding tools is allowed to be used for decoding comprises determining that one of the first decoding tool and the second decoding tool can be used for decoding the picture.

B11. The method of any one of embodiments B8-B10, wherein in case the computational complexity indicator satisfies a third condition, determining whether one or more coding tools is allowed to be used for decoding comprises determining that any one or more of the first decoding tool and the second decoding tool can be used for decoding the picture.

B12. The method of embodiment B11, wherein the first, second, and/or third conditions are related to a relation between (i) the computational complexity indicator and (ii) one or more threshold values.

B13. The method of embodiment B12, wherein the first condition is that a value of the computational complexity indicator is less than a first threshold value, the second condition is that the value of the computational complexity indicator is greater than or equal to the first threshold value but less than a second threshold value, and the third condition is that the value of the computational complexity indicator is greater than or equal to the second threshold value.

B14. The method of any one of embodiments B1-B13, wherein the computational complexity indicator is different from a video codec level indicator indicating a set of one or more restrictions on the coded video bitstream.

B15. The method of embodiment B14, wherein the video codec level indicator indicates a base level and the computational complexity indicator indicates an additional level, and the base level and the additional levels are levels to which an output layer set that is in scope when decoding the coded video bitstream conforms.

B16. The method of any one of embodiments B1-B15, wherein providing the computational complexity indicator comprises transmitting the bitstream, and the computational complexity indicator is included in any one or more of the followings:

(i) a Profile, Tier, Level, PTL, structure in the bitstream, (ii) General Constraints Information, GCI, structure in the bitstream, (iii) a Supplemental Enhancement Information, SEI, message, (iv) a Picture Parameter Set, PPS, (v) a Picture Header, PH, (vi) a Slice Header, SH, or (vii) a Video Usability Information, VUI.

B17. The method of embodiment B16, wherein the PTL structure or the GCI structure is included in any one of the followings: a Video Parameter Set, VPS, a Sequence Parameter Set, SPS, or Decoding Capability Information, DCI.

B18. The method of any one of embodiments B1-B17, wherein the computational complexity indicator is signaled using at least one of:

(i) Real-Time Streaming Protocol, RTSP;

(ii) Dynamic Adaptive Streaming DASH;

(iii) Motion Picture Experts Group-DASH, MPEG-DASH;

(iv) Hypertext Transfer Protocol, HTTP, Living Streaming, HLS;

(v) International Standard Organization, ISO, Base Media File Format, ISOBMFF;

(vi) Common Media Application Format, CMAF;

(vii) Session Description Protocol, SDP;

(viii) Real-Time Transport Protocol, RTP;

(ix) Session Initiation Protocol, SIP;

(x) Web Real-Time Communication, WebRTC; and/or (xi) Secure Frame, SFRAME.

C1. A computer program (443) comprising instructions (444) which when executed by processing circuitry (402) cause the processing circuitry to perform the method of any one of embodiments A1-B18.

C2. A carrier containing the computer program of embodiment C1, wherein the carrier is one of an electronic signal, an optical signal, a radio signal, and a computer readable storage medium.

D1. An apparatus (104 or 400) for decoding a picture included in a coded video bitstream, the apparatus being configured to:

obtain (s202) a computational complexity indicator associated with the coded video bitstream;

using the obtained computational complexity indicator, determine (s204) whether one or more coding tools is allowed to be used for decoding the picture;

based at least on the determination, decode (s206) the picture; and output (s208) the decoded picture.

D2. The apparatus of embodiment D1, wherein the apparatus is further configured to perform the method of any one of embodiments A2-A18.

E1. An apparatus (104 or 400) for decoding a picture included in a coded video bitstream, the apparatus being configured to:

obtain (s302) a computational complexity indicator indicating complexity of a computation needed for decoding the coded video bitstream; and provide (s304) to a decoder the computational complexity indicator associated with the coded video bitstream, wherein the obtained computational complexity indicator is configured to be used for determining whether one or more coding tools is allowed for decoding the picture.

E2. The apparatus of embodiment E1, wherein the apparatus is further configured to perform the method of any one of embodiments B2-B18.

F1. An apparatus (400), the apparatus comprising:

a memory (441); and processing circuitry (402) coupled to the memory, wherein the apparatus is configured to perform the method of any one of embodiments A1-B18.

CONCLUSION

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a picture included in a coded video bitstream, the method comprising:

obtaining a computational complexity indicator indicating complexity of a computation needed for decoding the coded video bitstream;

determining whether at least a first coding tool is allowed to be used for decoding the picture based on the obtained computational complexity indicator, wherein the determining comprises determining whether a first condition is satisfied based on the obtained computational complexity indicator; and based on determining that the first condition is satisfied, decoding the picture using the first coding tool, wherein the first coding tool comprises an artificial neural network, and decoding the picture using the first coding tool comprises using the artificial neural network to perform in-loop filtering.

2. The method of claim 1, wherein the computational complexity indicator corresponds to any one or more of the following:

(i) a video codec level indicator or a video codec tier indicator, indicating a set of one or more restrictions on the coded video bitstream, wherein the video codec level indicator indicates a level to which an output layer set that is in scope when decoding at least a portion of the coded video bitstream conforms;

(ii) a resolution;

(iii) a picture size;

(iv) a sample rate;

(v) a frame rate;

(vi) a processing capability indicator indicating a processing capability required for decoding at least a portion of the coded video bitstream; or (vii) a memory size indicating a size of a memory required for decoding at least a portion of the coded video bitstream.

3. The method of claim 1, wherein the computational complexity indicator has a first value, and the decoder is configured to compare the first value of the computational complexity indicator to a threshold value, and the decoder is further configured to decode the picture using the first decoding tool based on the comparison.

4. The method of claim 1, wherein the first decoding tool has a first computational complexity, a second decoding tool has a second computational complexity, the first computational complexity is lower than the second computational complexity, and determining whether the first coding tool is allowed to be used for decoding comprises selecting one of the first decoding tool and the second decoding tool for decoding the picture based on the first computational complexity and/or the second computational complexity.

5. The method of claim 4, wherein in case the computational complexity indicator satisfies the first condition, determining whether the first coding tool is allowed to be used for decoding comprises determining that none of the first decoding tool and the second decoding tool can be used for decoding the picture.

6. The method of claim 4, wherein in case the computational complexity indicator satisfies a second condition, determining whether the first coding tool is allowed to be used for decoding comprises determining that one of the first decoding tool and the second decoding tool can be used for decoding the picture.

7. The method of claim 4, wherein in case the computational complexity indicator satisfies a third condition, determining whether the first coding tool is allowed to be used for decoding comprises determining that any one or more of the first decoding tool and the second decoding tool can be used for decoding the picture, wherein the first, second, and/or third conditions are related to a relation between (i) the computational complexity indicator and (ii) one or more threshold values, wherein the first condition is that a value of the computational complexity indicator is less than a first threshold value,
the second condition is that the value of the computational complexity indicator is greater than or equal to the first threshold value but less than a second threshold value, and
the third condition is that the value of the computational complexity indicator is greater than or equal to the second threshold value.

8. The method of claim 1, wherein the computational complexity indicator is different from a video codec level indicator indicating at least a first set restrictions on the coded video bitstream, wherein the video codec level indicator indicates a base level and the computational complexity indicator indicates an additional level, and
the base level and the additional levels are levels to which an output layer set that is in scope when decoding the coded video bitstream conforms.

9. The method of claim 1, wherein providing the computational complexity indicator comprises transmitting the bitstream, and
the computational complexity indicator is included in any one or more of the followings:
(i) a Profile, Tier, Level, PTL, structure in the bitstream,
(ii) General Constraints Information, GCI, structure in the bitstream,
(iii) a Supplemental Enhancement Information, SEI, message,
(iv) a Picture Parameter Set, PPS,
(v) a Picture Header, PH,
(vi) a Slice Header, SH, or
(vii) a Video Usability Information, VUI.

10. The method of claim 9, wherein the PTL structure or the GCI structure is included in any one of the followings: a Video Parameter Set, VPS, a Sequence Parameter Set, SPS, or Decoding Capability Information, DCI.

11. The method of claim 1, wherein the computational complexity indicator is signaled using at least one of:
(i) Real-Time Streaming Protocol, RTSP;
(ii) Dynamic Adaptive Streaming DASH;
(iii) Motion Picture Experts Group-DASH, MPEG-DASH;
(iv) Hypertext Transfer Protocol, HTTP, Living Streaming, HLS;
(v) International Standard Organization, ISO, Base Media File Format, ISOBMFF;
(vi) Common Media Application Format, CMAF;
(vii) Session Description Protocol, SDP;
(viii) Real-Time Transport Protocol, RTP;
(ix) Session Initiation Protocol, SIP;
(x) Web Real-Time Communication, WebRTC; and/or
(xi) Secure Frame, SFRAME.

12. An apparatus for decoding a picture included in a coded video bitstream, the apparatus comprising:
a memory; and
processing circuitry coupled to the memory, wherein the apparatus is configured to perform a method comprising:
obtaining a computational complexity indicator indicating complexity of a computation needed for decoding the coded video bitstream;
determining whether at least a first coding tool is allowed to be used for decoding the picture based on the obtained computational complexity indicator, wherein the determining comprises determining whether a first condition is satisfied based on the obtained computational complexity indicator; and
based on determining that the first condition is satisfied, decoding the picture using the first coding tool, wherein the first coding tool comprises an artificial neural network, and
decoding the picture using the first coding tool comprises using the artificial neural network to perform in-loop filtering.

13. A computer program product comprising a non-transitory computer readable medium storing instructions which when executed by processing circuitry of a system causes the system to perform a process for decoding a picture included in a coded video bitstream, which comprises:
obtaining a computational complexity indicator indicating complexity of a computation needed for decoding the coded video bitstream;
determining whether at least a first coding tool is allowed to be used for decoding the picture based on the obtained computational complexity indicator, wherein the determining comprises determining whether a first condition is satisfied based on the obtained computational complexity indicator; and
based on determining that the first condition is satisfied, decoding the picture using the first coding tool, wherein the first coding tool comprises an artificial neural network, and
decoding the picture using the first coding tool comprises using the artificial neural network to perform in-loop filtering.

* * * * *